United States Patent
Collins et al.

(10) Patent No.: US 8,240,623 B2
(45) Date of Patent: *Aug. 14, 2012

(54) LEVER LOCK SLOTWALL STORAGE DEVICE

(75) Inventors: Scott M. Collins, Newburgh, IN (US); Craig R. Forest, Atlanta, GA (US); Guy E. Garrison, Evansville, IN (US); Gilius A. Gaska, Saint Joseph, MI (US); David E. Moeller, Boston, MA (US); Michael J. Scherzer, Saint Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/240,213

(22) Filed: Sep. 22, 2011

(65) Prior Publication Data

US 2012/0006778 A1    Jan. 12, 2012

Related U.S. Application Data

(60) Division of application No. 12/642,032, filed on Dec. 18, 2009, now Pat. No. 8,070,118, which is a continuation-in-part of application No. 11/923,945, filed on Oct. 25, 2007, now Pat. No. 7,883,068.

(60) Provisional application No. 60/975,809, filed on Sep. 27, 2007, provisional application No. 60/921,422, filed on Apr. 2, 2007.

(51) Int. Cl.
*A47B 96/00* (2006.01)
*A47F 5/08* (2006.01)

(52) U.S. Cl. ......... 248/222.51; 248/225.21; 248/225.11; 211/94.01; 211/87.01

(58) Field of Classification Search ............. 248/231.51, 248/231.2, 223.41, 222.14, 225.11, 225.1, 248/229, 316.1, 316.3, 316.51, 222.11, 222.51, 248/222.52, 225.21, 227.1, 339, 340, 221.11, 248/223.4; 211/89.01, 94.01, 19, 62, 162, 211/87.01, 57.1, 59.1, 88.01, 106; 403/157, 403/80, 105

See application file for complete search history.

(56) References Cited

U.S. PATENT DOCUMENTS

| | | | | |
|---|---|---|---|---|
| 2,057,980 | A * | 10/1936 | Ringzelli | 248/539 |
| 2,589,520 | A * | 3/1952 | Wallenius | 248/177.1 |
| 4,209,098 | A * | 6/1980 | Adams | 211/70.8 |
| 4,678,151 | A * | 7/1987 | Radek | 248/223.41 |
| 6,119,878 | A * | 9/2000 | Zen | 211/94.01 |

(Continued)

*Primary Examiner* — Tan Le
(74) *Attorney, Agent, or Firm* — Michel M. Rose; Robert L. Judd

(57) ABSTRACT

A mounting bracket is provided for removably mounting a storage device on a slot track or slotwall panel having a plurality of slots having undercut sidewalls that form generally "T" shaped slats. The mounting bracket includes a support surface having a first "J" shaped hook to hook over the edge of a slat and into the undercut sidewall and a second "J" shaped hook to hook into a second slot and into the undercut sidewall. The mounting bracket includes a storage device connector attached to the support surface at a first end and has a second end. The storage device connector can include a lock rotatably mounted on the top wall adjacent the first "J" shaped hook having a locking member and an operator that is rotatable between locked and unlocked positions. A storage device can be coupled to the second end of the storage device connector. The storage device can be an actuatable holding system for a bicycle, or other storage device such as a basket or a storage shelf.

15 Claims, 17 Drawing Sheets

U.S. PATENT DOCUMENTS

| | | | |
|---|---|---|---|
| 6,654,990 B2 * | 12/2003 | Liu | 24/598.5 |
| 7,055,703 B2 * | 6/2006 | Perkins et al. | 211/94.01 |
| 7,757,869 B2 * | 7/2010 | Lawson | 211/94.01 |
| 7,883,068 B2 * | 2/2011 | Forest et al. | 248/324 |
| 8,070,118 B1 * | 12/2011 | Collins et al. | 248/227.1 |
| 2010/0123063 A1 * | 5/2010 | Bauchet et al. | 248/274.1 |

* cited by examiner

LEVER LOCK SLOTWALL STORAGE DEVICE

CROSS REFERENCE TO RELATED APPLICATIONS

This application is a continuation of application Ser. No. 12/642,032, filed Dec. 18, 2009, which is a continuation in part of application Ser. No. 11/923,945, filed Oct. 25, 2007, which claims the benefit of Provisional Application No. 60/921,422, filed Apr. 2, 2007 and Provisional Application No. 60/975,809, filed Sep. 27, 2007. This application is also related to Design Application No. 29/332,436, filed Aug. 5, 2008, Design Application No. 29/322,437, filed Aug. 5, 2008, Design Application No. 29/332,434, filed Aug. 5, 2008 and Design Application No. 29/337,999, filed Jun. 3, 2009. Application Ser. Nos. 12/642,032 and 11/923,945 are hereby incorporated by reference.

BACKGROUND OF THE INVENTION

1. Field of the Invention

The invention relates to devices and systems for holding an object or objects on a slot track or slot wall panel.

2. Description of the Related Art

Slotwall panels, slot tracks and corresponding brackets are well known systems for mounting objects on walls or other surfaces. Some slotwall and slot track brackets are easily moved and subject in inadvertent removal or dislodging. Other brackets are known that can be more securely connected to a slotwall panel or slot track. Devices and systems are known for mounting bicycles from wall and ceiling surfaces. There is a continuing need for improved brackets for slotwall panels and slot tracks that are easy to use and able to securely support large and heavy objects.

SUMMARY OF THE INVENTION

A mounting bracket for removably mounting a storage device on first and second spaced apart slots arranged to form a slat having a face with edges defined by the first and second slots. The first and second slots can have a bottom wall generally parallel to and spaced inwardly from the face of the slat and can have at least one undercut sidewall that forms at least one projecting slat edge projecting over the undercut sidewall. The mounting bracket can have a support surface, a first "J" shaped hook extending from one edge of the support surface. The first "J" shaped hook can open in a first direction to hook over the projecting slat edge of the at least one slat and into the undercut sidewall of the first slot. The support surface can have a second "J" shaped hook extending from the opposite edge of the support surface and the second "J" shaped hook can open in the first direction to hook in the second slot and into the undercut sidewall of the second slot. A storage device connector can be attached to the support surface at a first end and can have a second end. The storage device connector can have top and side walls extending from the first end to the second end and a lock rotatably mounted on the top wall adjacent the first "J" shaped hook. The lock can have a locking member and an operator. The lock can be rotatable between locked and unlocked positions wherein, in the locked position the locking member is positioned in the first slot with the first "J" shaped hook to prevent movement of the first "J" shaped hook relative to the first and second slots, and in the unlocked position, the locking member is positioned out of the first slot to allow movement of the first "J" shaped hook relative to the first and second slots. A storage device can be coupled to the second end. The lock can further include a base rotatably mounted to the top wall with the locking member positioned on a first portion of the base and the operator positioned on a second portion of the base spaced from the locking member.

The operator can be an upstanding member connected to the base to be gripped by a user and the locking member can be a generally rectangular block connected to the first portion of the base and can be sized to, with the first "J" shaped hook, fill the first slot.

The block can include a top wall that can be beveled and the beveled top wall can engage the edge of the undercut sidewall adjacent a slat in the locked position to secure the lock in the locked position.

The support surface can include a mounting post projecting from the support surface that can have a distal end. The mounting post can have top and side surfaces extending from the support surface to the distal end and can have a first generally "U" shaped flange extending outwardly from the top and side surfaces at the distal end that can form a generally "U" shaped channel between the first generally "U" shaped flange and the support surface. The first end of the storage device connector can include a second generally "U" shaped flange extending inwardly from the top and side walls. The storage device connector can be attached to the support surface with the second generally "U" shaped flange positioned on the mounting post in the generally "U" shaped channel.

Portions of the second generally "U" shaped flange along the storage connector side walls can extend beyond the generally "U" shaped channel when the storage connector device is attached to the support surface and can include a detent to secure the storage device connector to the mounting bracket.

The storage device can be an actuatable holding system including a collar coupled to the second end of the storage device connector and an actuator housing coupled to the collar with the actuator housing extending from the storage device connector. First and second arms can be pivotally moveable relative to the actuator housing between an opened position and a closed position. An arm contacting element can be disposed on the actuator housing and axially movable relative to the actuator housing between a first position, in which the arms are moved to the open position, and a second position, in which the arms are moved to the closed position, and rotationally movable relative to the actuator housing to releasably lock the arm contacting element in the first and second positions. A button can be provided axially movable relative to the actuator housing and operable upon a first actuation to move the arm contacting element to the first position and upon a second, consecutive actuation to move the arm contacting element to the second position. The button can include a distal portion forming a contact surface for actuating the actuatable holding system.

The storage device can be a storage basket having a rear wall, a bottom wall, side walls and a front wall and the rear wall. The rear wall can be coupled to the second end of at least two storage device connectors.

The storage device can be a storage shelf having a storage surface and a rear surface. The rear surface can coupled to the second end of at least two storage device connectors.

DETAILED DESCRIPTION

Figure 1:
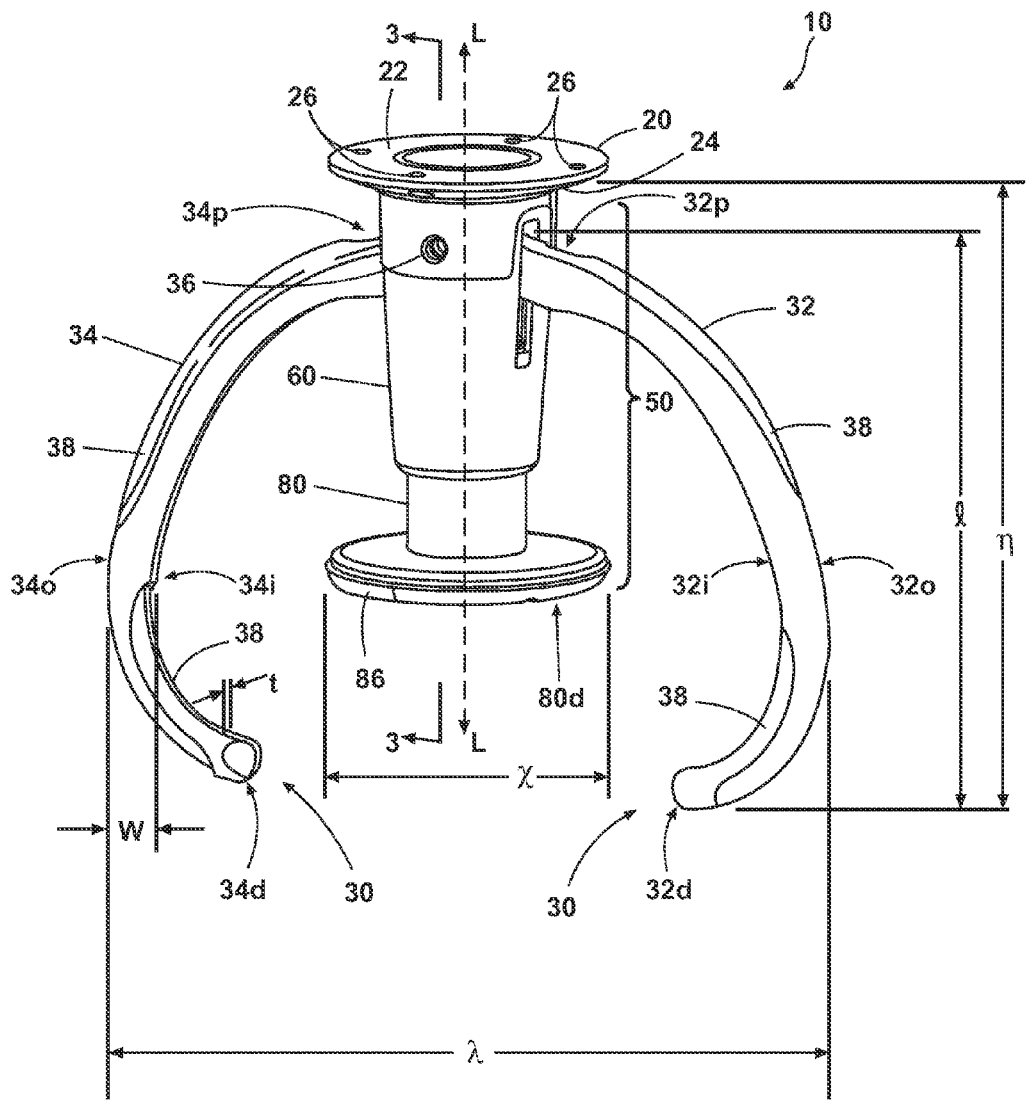
FIG. 1 is a perspective view of one exemplary embodiment of an actuatable holding system in an opened position.

A system for holding an object is provided, and although as described below the system is described as a system, it is understood that the system can also be characterized as a device. Further, to the extent that the object that is held by the system is described below as a bicycle, it is understood that many objects can also be held by the system and that the actuatable holding system described herein is not limited to use with a bicycle. For example, the actuatable holding system can be used to hold tools that have a spaced handle, such as some shovels. In another non-limiting example, the actuatable holding system can be used to hold kitchen devices such as frying pans. In still another non-limiting example, the actuatable holding system can be used to hold larger objects, such as industrial components or kayaks. It is also understood that to the extent that the system as described cannot hold a particular object because one or more of the components is not particularly suited to work with that object, the system as described is easily adaptable to accommodate such objects. By way of a non-limiting example, the size of the system can be changed in order to accommodate objects that include space to promote holding that is smaller or larger than the space on the inner portion of a bicycle wheel. By way of a further non-limiting example, arms of the system as described below can be adapted to operate as actuatable magnets that hold an object that is magnetized and not capable of being held by the arms as described. A person skilled in the art will also recognize that to the extent that the dimensions disclosed herein are described with respect to a radius or diameter that is typically be used to describe circular or cylindrical elements, equivalent measurements for components that are a different geometric shape can be easily determined. For example, when a diameter of a base is discussed, if the base is not approximately circular in shape and is instead approximately rectangular in shape, equivalent lengths and widths for the base can be easily determined by a person skilled in the art. This transposition of dimensions between various geometric shapes can be used with respect to any components disclosed herein. Similarly, although some example dimensions and ranges of dimensions for various components are given with respect to using the system for holding a bicycle, to the extent that the system is adapted for use with other objects, or even other size bicycles, the dimensions can be easily adjusted for the intended use of the system.

FIGS. 1-4 illustrate one exemplary embodiment of an actuatable holding system 10. As shown, the system 10 generally includes a base 20, one or more arms 30, and an actuation element 50. The base 20 can be attached to a surface and can further include an attachment side 22, which is the side that will typically abut the surface that the base 20 is mounted to, and a holding side 24, which is the side that will typically face an object being held. The one or more arms 30, first and second arms 32, 34 as illustrated, can be pivotally connected to the base 20 and extend outward from the holding side 24 of the base 20. The actuation element 50 can include a wide variety of components, as will be described in further detail below, but generally it can extend outward, distal from the holding side 24 of the base 20, and can be operable to move the first and second arms 32, 34 between an opened position and a closed position. A longitudinal axis L can extend through the actuation element 50.

The base 20 can be any number of shapes and sizes. The shape and size of the base 20 will likely depend, at least in part, on the shape and size of the other components of the system 10, and further, the object that the system 10 supports. In the illustrated embodiment the base 20 is circular. In one embodiment the diameter of the base 20 is approximately in the range of 5 to 15 centimeters. In the illustrated embodiment the diameter of the base 20 is approximately 9.5 centimeters. It can also be made from any material that is suitable for holding the other components of the system 10 and the object that the system 10 supports. In an exemplary embodiment the base 20 is aluminum. In another embodiment the base 20 is plastic.

The base 20 can be attached to any surface. In one embodiment the base 20 can be attached to a ceiling. In other embodiments it can be attached to a shelf, floor, or wall. An array of attachment mechanisms can be used to attach the base 20 to the surface, but in the illustrated embodiment four screws are inserted through apertures 26 and into the surface. In another embodiment a single screw can be used. The single screw can be located centrally with respect to the system 10, or in any other desired location. Still in other embodiments adhesives or other mechanisms used for attaching an object to a surface can be used. Further, in an exemplary embodiment of the system 10, the base 20 is pivotable. A base pivot could also be incorporated into the base 20 such that the base 20 can be situated at a multitude of angles.

The base 20 can also be attached to a surface without using any tools. In an exemplary embodiment a single, central screw can be associated with the base 20 such that rotation of the central screw allows the base to be attached to and detached from the ceiling, in a manner similar to the way a light bulb is screwed into and out of a location. Further, rotation of such a screw can be assisted by using the one or more arms 30, which will be described in further detail below. Particularly, the one or more arms 30 can rotate around the longitudinal axis L of the actuation element 50 to provide leverage to assist with attaching or detaching the base 20 from a surface. Alternatively, the one or more arms 30 can be removable to allow alternative attachment mechanisms to be associated with the base 20 to assist with installation and removal of the base 20 from a surface. Once installed, the one or more arms 30 can then be reattached to the base 20 for subsequent use.

Figure 2:
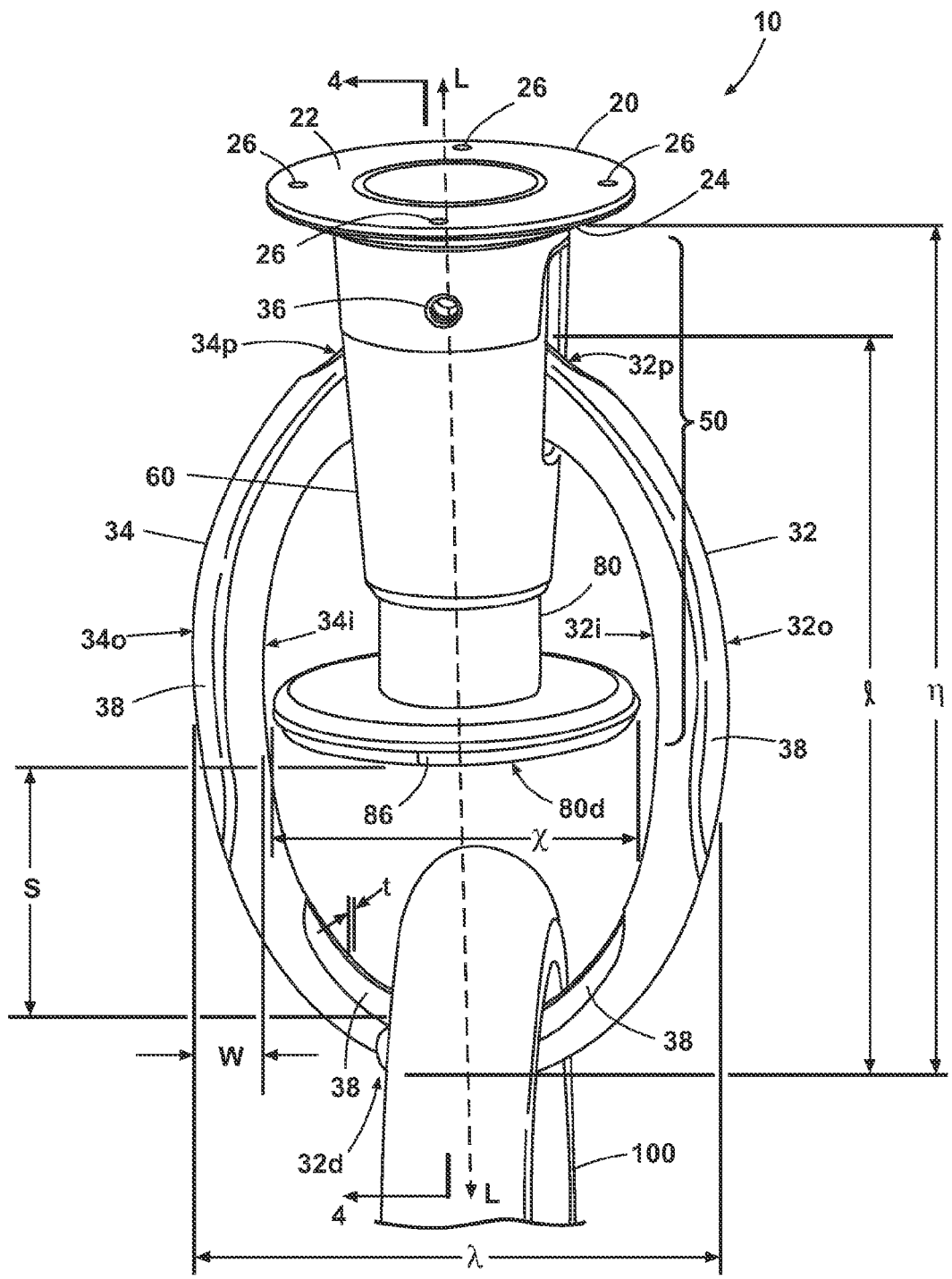
FIG. 2 is a perspective view of the system of FIG. 1 in a closed position.

One or more arms 30 can be coupled to the base 20 and adapted to receive an object, such as a bicycle. In an exemplary embodiment there are two arms, first and second arms 32, 34. The first and second arms 32, 34 can include proximal portions 32$p$, 34$p$ and distal portions 32$d$, 34$d$, respectively. The proximal portions 32$p$, 34$p$ can be used to couple the first and second arms 32, 34 to the base 20 while the distal portions 32$d$, 34$d$ can be used to receive a wheel 100 and associated rim of the bicycle, as shown in FIG. 2. The wheel 100 can sometimes be referred to as a tire. Alternatively, one arm or three or more arms can also be used. In one embodiment where the one or more arms 30 is one arm, the one arm can be in contact with a sidewall in the closed position. The sidewall can be part of the system 10 itself, or alternatively, it can be a separate component, such as a wall near a location where the system 10 is installed. The one arm does not need to be in contact with the sidewall when in the closed position, but in an exemplary embodiment it is located close enough to the sidewall such that it is capable of holding the wheel 100 in a desired location. In the opened position the one arm can be at a location that allows the wheel 100 to no longer be held by the device 10. In another embodiment where the one or more arms 30 is one arm, the one arm can swing such that a distal end of the one arm approximately moves in the shape of a semi-circle between the opened position and the closed position. Turning back to embodiments that include the one or more arms 30 having first and second arms 32, 34, the first and second arms 32, 34 can extend outward from the holding side 24 of the base 20 and can be coupled to the base 20 at the proximal portions 32$p$, 34$p$ by an arm pivot 36. In one embodiment the first and second arms 32, 34 can further include bearings, which can further assist in movement of the first and second arms 32, 34. In another embodiment the bearings can be bushings, and in still other embodiments a person skilled in the art will recognize that other types of bearings can be used.

Turning attention back to the arm pivot 36, although the arm pivot 36 in the illustrated embodiment is a single pivot, each of the first and second arms 32, 34 can have their own pivot. The arm pivot 36 is one way in which the first and second arms 32, 34 can be moved between the opened position, as illustrated in FIG. 1, and the closed position, as illustrated in FIG. 2. In the opened position the first and second arms 32, 34 are generally spaced apart so that they are ready to receive the bicycle wheel 100. In one embodiment the distance between outermost portions 32$o$, 34$o$ of the first and second arms 32, 34, respectively, in the opened position is approximately in the range of 30 to 40 centimeters. In the illustrated embodiment the distance between the outermost portions 32$o$, 34$o$ of the first and second arms 32, 34 in the opened position is approximately 35.5 centimeters. In the closed position, the first and second arms 32, 34 are closer together than they are in the opened position and they can be generally adapted to hold the bicycle wheel 100. In one embodiment the distal portions 32$d$, 34$d$ of the first and second arms 32, 34 cross each other, which can provide added holding security. In another embodiment the distal portions 32$d$, 34$d$ of the first and second arms 32, 34 contact each other. In an exemplary embodiment the first and second arms 32, 34 are spaced approximately 0.5 centimeters apart when in the closed position. In one embodiment the distance between the outermost portions 32$o$, 34$o$ of the first and second arms 32, 34 in the closed position is approximately in the range of 10 to 20 centimeters. In the illustrated embodiment the distance between the outermost portions 32$o$, 34$o$ of the first and second arms 32, 34 in the closed position is approximately 14 centimeters. In instances where the system 10 is adapted for use with other types of objects, or even different size bicycles, the distance between the outermost portions 32$o$, 34$o$ of the first and second arms 32, 34 in the opened and closed positions can vary greatly in comparison to the disclosed embodiments. By way of a non-limiting example, in an instance where the system 10 is adapted to hold a kitchen device such as a frying pan, the distance between the outermost portions 32$o$, 34$o$ of the first and second arms 32, 34 in either the opened or closed positions can be just a few centimeters. Similarly, by way of a further non-limiting example, in an instance where the system 10 is adapted to hold larger objects, such as industrial components or kayaks, the distance between the outermost portions 32$o$, 34$o$ of the first and second arms 32, 34 I neither the opened or closed positions can be 0.5 meters, 1 meter, or even larger. Although the illustrated embodiments depict the opened and closed positions, one or more intermediate positions located between the opened and closed positions can also be incorporated into the system 10. It is also understood that other positions beyond the illustrated opened and closed positions can also be incorporated into the system 10.

The first and second arms 32, 34 can be shaped and sized in a myriad of ways, but in one exemplary embodiment the first and second arms 32, 34 are curved. For example, the arms can be curved inward toward the longitudinal axis. The size of the first and second arms 32, 34, including a length, a width, and a thickness, can depend, at least in part, on the intended use of the system 10. It is understood that many sizes of arms can be used depending, at least in part, on the size, shape, and weight of the object the system 10 is used to hold. For example, systems can be built for specific bicycle types or specific bicycle wheel types. In the illustrated embodiment the first and second arms 32, 34 have a length £ measured from the proximal portions 32$p$, 34$p$ to the distal portions 32$d$, 34$d$ of approximately 21.5 centimeters, a width w measured from the outermost portions 32$o$, 34$o$ of the first and second arms 32, 34 to inner portion 32$i$, 34$i$ directly parallel to the outermost portions 32$o$, 34$o$ of the first and second arms 32, 34 of approximately 1.5 centimeters, and a thickness t of the first and second arms 32, 34 of approximately 1 centimeter. The length £, width w, and thickness t of the first and second arms 32, 34 in the illustrated embodiment are equal, although they do not have to be, and furthermore are suitable for any bicycle wheel, including bicycles wheels with an approximate width up to and including 2.5 inches and specially designed "aerowheels" with deep-dish profiles. Other bicycle wheels that are also suitable for use with the system 10 include, but are not limited, to 12 inch by 2 inch wheels, 16 inch by 2 inch wheels, 24 inch by 4 inch wheels, 26 inch by 4 inch wheels, and 29 inch by 4 inch wheels, where the first dimension represents a diameter of the wheel and the second dimension represents a width of the wheel. In an alternative embodiment the first and second arms 32, 34 can be adjustable, thus allowing a user to adjust the length l, width w, and/or thickness t based on the intended purpose of the system 10. A person skilled in the art will recognize that any sort of adjustable mechanism can easily be incorporated into the first and second arms 32, 34, but by way of one non-limiting example, in one embodiment the first and second arms 32, 34 can include recesses to receive pins such that the pins can be selectively inserted into the recesses in order to set a desired length, width, and/or thickness.

The first and second arms 32, 34 can be made out of many different materials. In some embodiments a single material can be used, but in other embodiments multiple materials can be used. In an exemplary embodiment the first and second arms 32, 34 can be made of aluminum. In another embodiment the first and second arms 32, 24 can be made of plastic. In another exemplary embodiment the first and second arms 32, 34 can have one or more softer materials disposed on them. For example, pads 38 can be placed on the distal portions 32p, 34p of the first and second arms 32, 34. The pads 38 can protect both the bicycle and the first and second arms 32, 34 from becoming damaged through use. The pads 38 can also be disposed on other locations of the first and second arms, 32, 34, as is illustrated in FIGS. 1-4, whether for aesthetics, security, functionality, or otherwise. In one embodiment the pads 38 are made of ABS thermoplastic. In another embodiment the pads 38 are made of rubber, such as vinyl or urethane.

Figure 3:
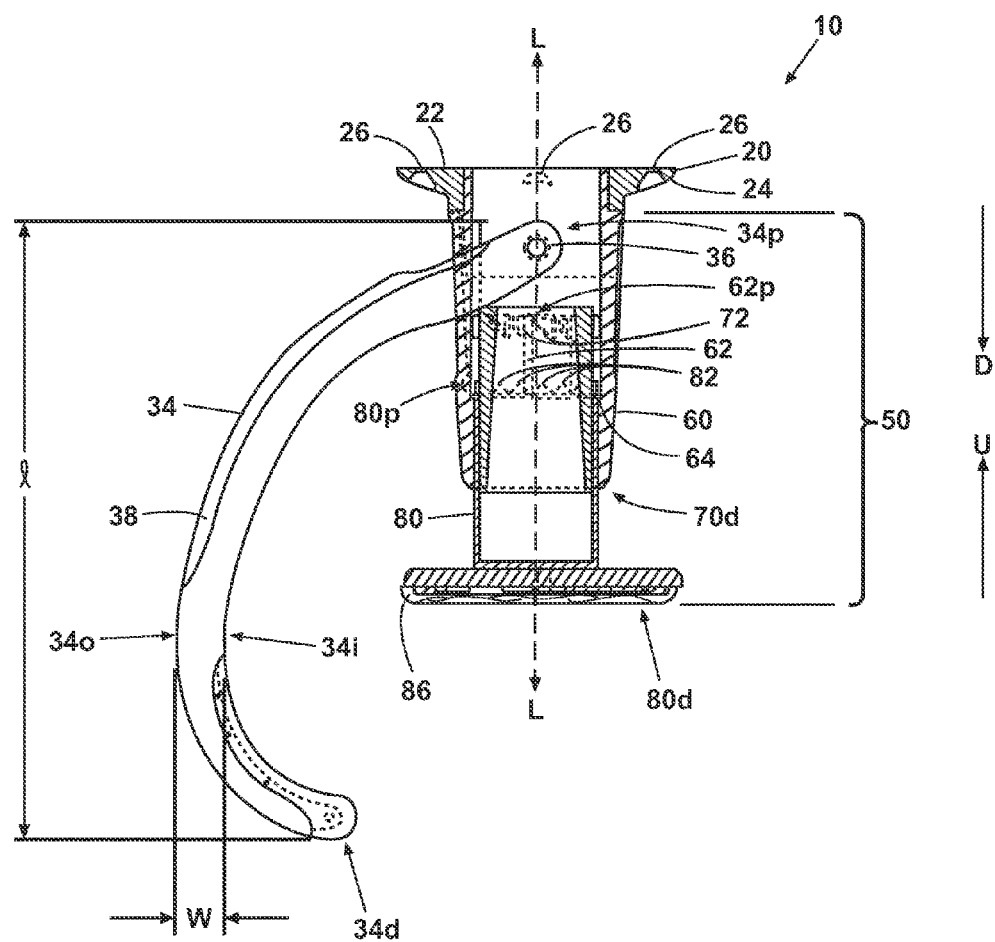
FIG. 3 is a cross sectional view of the system of FIG. 1 taken at line 3-3.
Figure 3A:
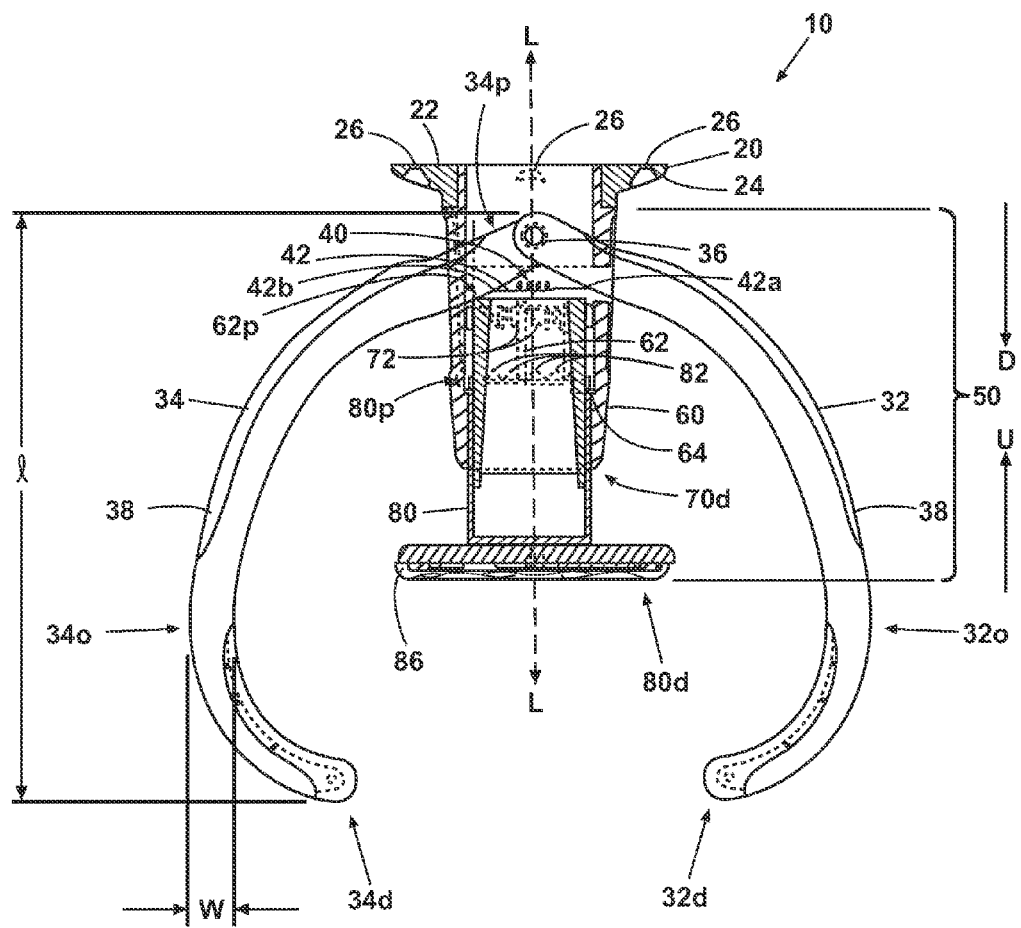
FIG. 3A is an alternate embodiment of the cross sectional view of FIG. 3 illustrating a biasing mechanism.
Figure 3B:
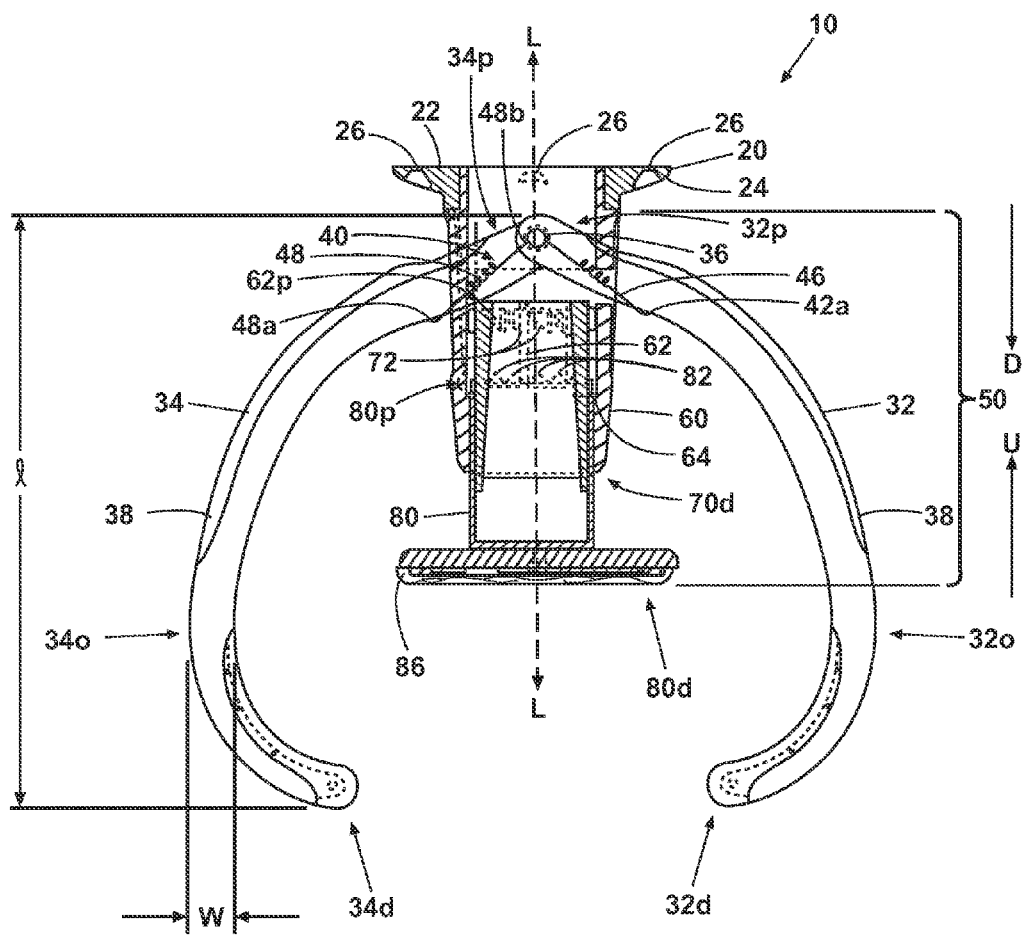
FIG. 3B is an alternate embodiment of the cross sectional view of FIG. 3 illustrating a second embodiment of a biasing mechanism.

A biasing mechanism 40, illustrated in FIGS. 3A and 3B, can be associated with the first and second arms 32, 34. The biasing mechanism 40 can be configured to bias the first and second arms 32, 34 in the opened position, the closed position, or any other desired position. In one embodiment the biasing mechanism bias the first and second arms 32, 34 inward, toward the button 80, such that they are biased in an approximate direction D. At least one benefit of such an embodiment is that because it is bias toward the button, the device 10 can be mounted on a wall or floor and still be functional. This is because even though gravity is no longer assisting in directing the first and second arms 32, 34 toward the button 80, the biasing mechanism 40 does assist in such a manner and thus makes the device 10 operable even when mounted on a wall. In the embodiment illustrated in FIG. 3A, the biasing mechanism 40 includes a spring 42 associated with the first and second arms 32, 34. More specifically, a first end 42a of the spring 42 can be associated with the proximal portion 32p of the first arm 32 and a second end 42b of the spring 42 can be associated with the proximal portion 34p of the second arm. In the illustrated embodiment the spring 42 is an extension spring that is approximately 0.65 centimeters wide, although many other types of springs, such as torsion, leaf, or others, and sizes can be used in the illustrated embodiment or in other embodiments. Likewise, the biasing mechanism 40 does not need to be a spring, as other types of biasing mechanisms can be used in the illustrated embodiment or in other embodiments. Further, the biasing mechanism 40 can be disposed in any location that can bias the first and second arms 32, 34 in a particular position. In the illustrated embodiment the spring 42 is disposed within the actuator housing 60.

By way of a further non-limiting example of a biasing mechanism, FIG. 3B illustrates an exemplary embodiment that includes a first spring 46 associated with the first arm 32 and a second spring 48 associated with the second arm 34. First ends 46a, 48a of the first and second springs 46, 48 can be coupled to the proximal portions 32p, 34p of the first and second arms, and second ends 46b, 48b of the springs 46, 48 can be connected to an area near the arm pivot 36. In the illustrated embodiment the springs 46, 48 are torsion springs, but again the type, size, and placement of the biasing mechanism 40 can be easily adapted depending on the other components and the desired use of the device 10.

Another component of the system 10 can be the actuation element 50. The actuation element 50 can be operable to move the first and second arms 32, 34 in any number of positions, including the opened and closed positions, and can be located distal of the base 20. In one embodiment it can extend outward from the holding side 24 of the base 20. The actuation element 50 can include many features and components that can be selectively included in various embodiments. For instance, in one embodiment the actuation element 50 can be stable in at least two planes. In the illustrated embodiment the actuation element 50 is stable in at least two planes because it is stable in a first plane that runs through the longitudinal axis L of the actuation element 50, and it is stable in a second plane that is perpendicular to the longitudinal axis L of the actuation element 50. In other embodiments the actuation element 50 can be bi-stable. More specifically, the actuation element 50 can be bi-stable because it can be at rest in at least two positions. By way of non-limiting example, the bi-stable locations of the actuation element 50 can be the opened and closed positions. In an exemplary embodiment the actuation element 50 can selectively include an actuator housing 60, an arm contacting element 70, and a button 80, each of which is discussed in further detail below.

The actuator housing 60, illustrated best in FIGS. 3-5B, can extend from the holding side 24 of the base 20 and can be a variety of different shapes and sizes. In the illustrated embodiment the actuator housing 60 includes a longitudinal axis L that corresponds to the longitudinal axis L of the actuation element 50, as well as a length. In one embodiment the actuator housing 60 is approximately cylindrical in shape. In other embodiments it can take the form of other geometric shapes, such as pyramids or rectangular boxes. In one exemplary embodiment, illustrated best in FIGS. 3, 4, and 5B, the actuator housing 60 can include one or more locking prongs 62 that extend along at least a portion of the length. In the illustrated embodiment the actuator housing 60 includes eight locking prongs 62. The locking prongs 62 can be equally spaced apart around the shape of the actuator housing 60, so in the illustrated embodiment the eight locking prongs 62 are equally spaced around the 360 degree perimeter of the actuator housing 60. In embodiments where the actuator housing 60 is not circular, the locking prongs 62 can be equally spaced around the appropriate perimeter for the actuator housing 60. Each locking prong 62 can have the same shape and size, but it is not necessary that each locking prong 62 has the same shape and size. Some of the capabilities and functionality of the locking prongs 62 will be discussed further below.

The actuator housing 60 can also include a structure for restraining the button 80, a component that will be discussed in further detail below, from traveling beyond a desired distance. In the illustrated embodiment the structure is a rim 64, but it is understood that other similar structures can also be incorporated into the actuator housing 60. The rim 64 can prevent the button 80 from falling off of the actuator housing 60.

Figure 4:
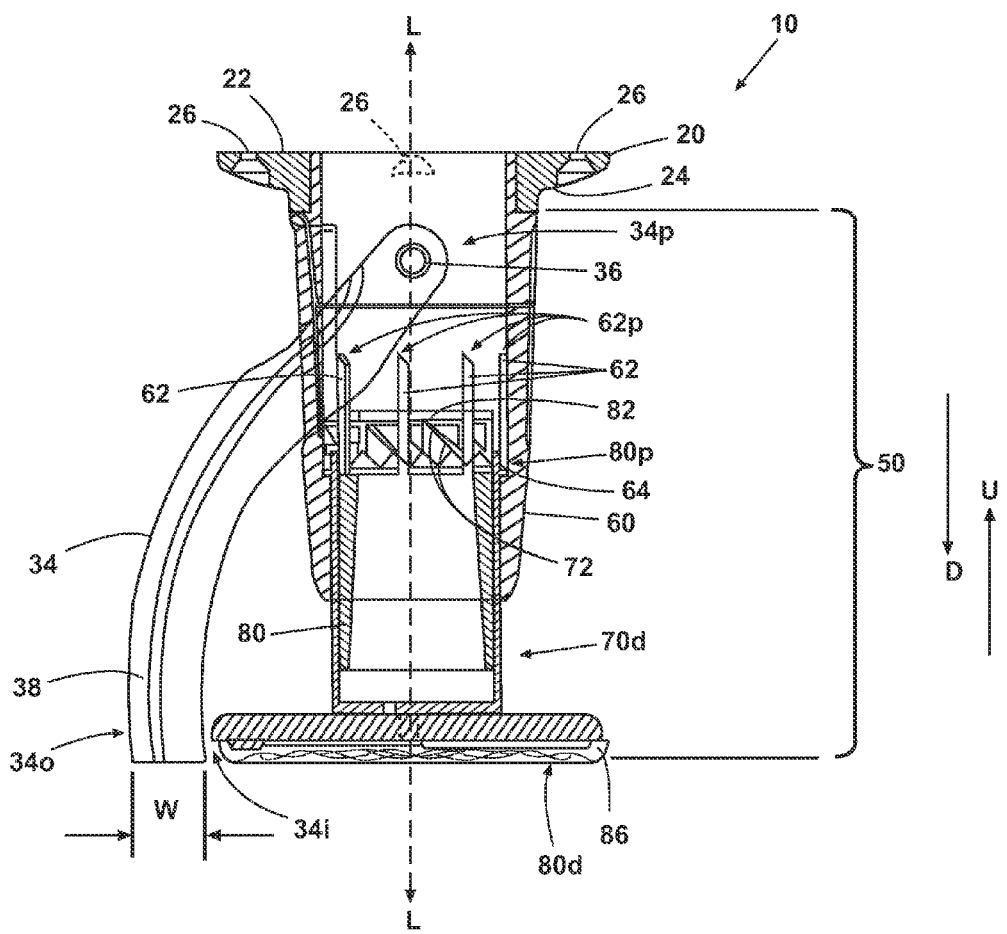
FIG. 4 is a cross sectional view of the system of FIG. 2 taken at line 4-4.
Figures 5A, 5B:
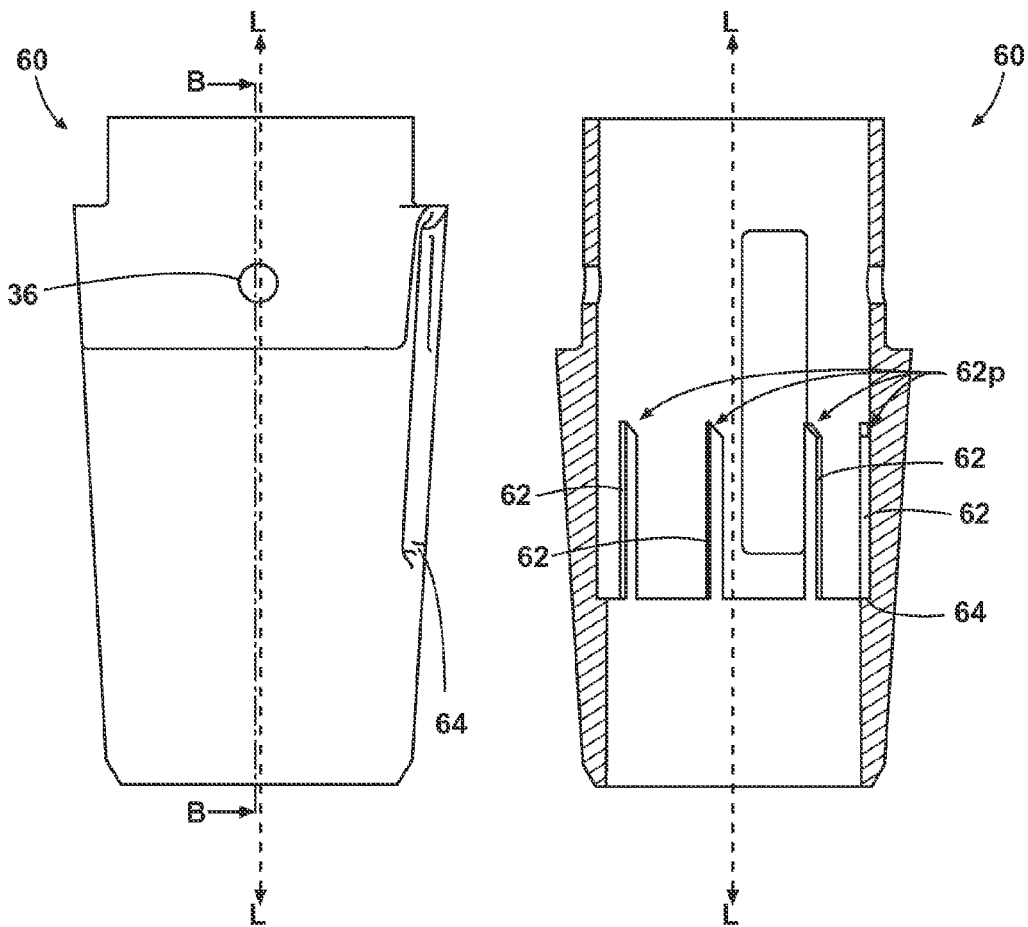
FIG. 5A is a side view of an actuator housing of the system of FIG. 1.
FIG. 5B is a cross sectional view of the actuator housing of FIG. 5A taken at line B-B.
Figure 6:
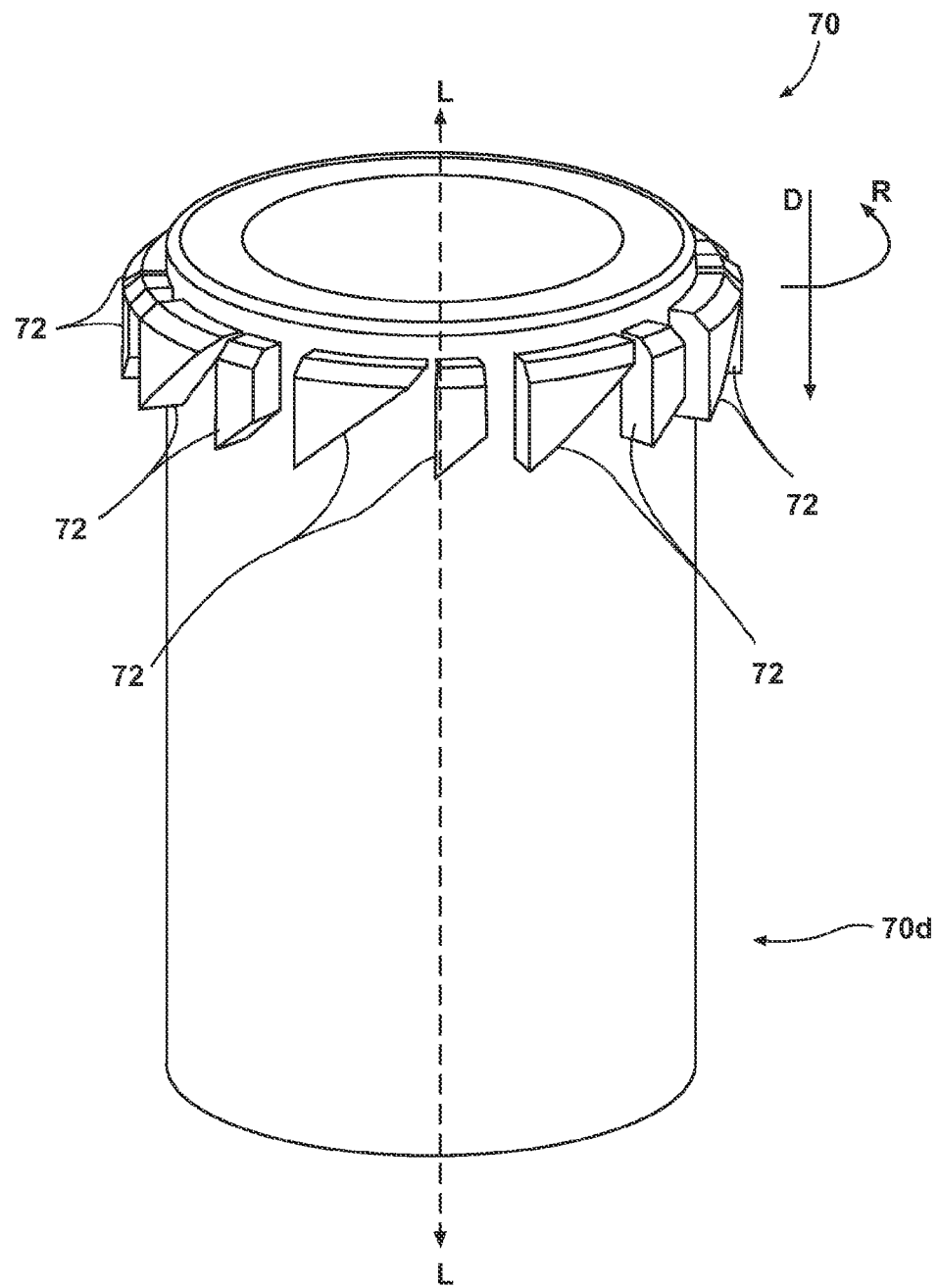
FIG. 6 is a perspective view of a arm contacting element of FIG. 1
Figure 7:
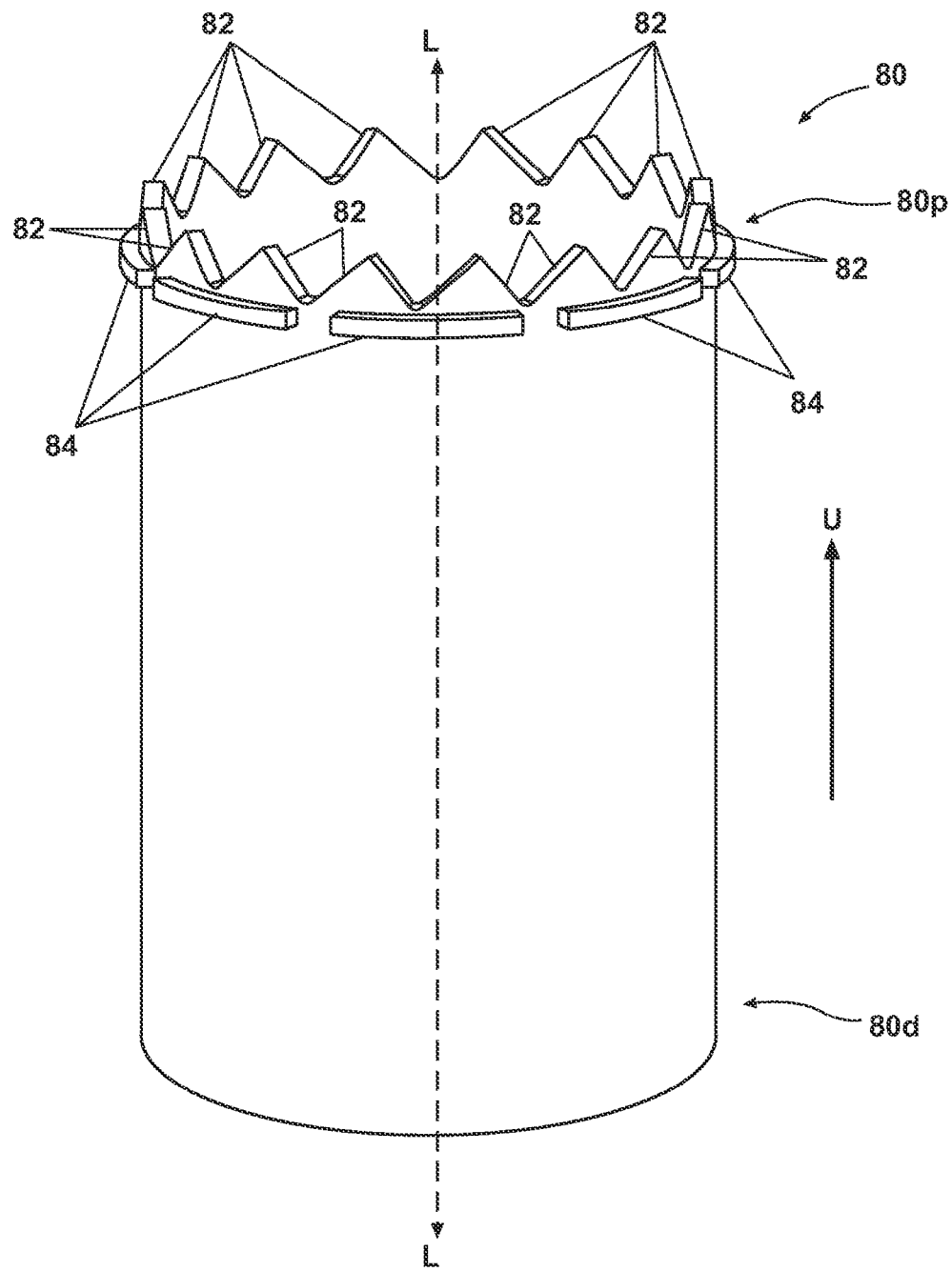
FIG. 7 is a perspective view of a button of FIG. 1.

Turning attention to the arm contacting element 70, illustrated best in FIGS. 3, 4, and 6, it can be the component of the actuation element 50 that is operable to actuate the first and second arms 32, 34 in any number of positions, including the opened and closed positions. Further, it can be adapted to actuate the first and second arms 32, 34 in any number of ways, but in one embodiment it can physically contact at least one of the first and second arms 32, 34. In other embodiments it can actuate intermediate components that in turn contact at least one of the first and second arms 32, 34 to move them. When the first and second arms 32, 34 are in the opened position, the arm contacting element 70 can be in a first position, as illustrated in FIG. 3, and when the first and second arms 32, 34 are in the closed position, the arm contacting element 70 can be in a second position, as illustrated in FIG. 4. In the illustrated embodiment the arm contacting element 70 is more distal from the base 20 in the second position than in the first position. Further, just as the first and second arms 32, 34 can be in any number of positions besides the opened and closed positions, the arm contacting element 70 can be in any number of positions besides the first and second positions.

Similar to the actuator housing 60, the arm contacting element 70 can also be located distal of the base 20 and can be a variety of different shapes and sizes. In the illustrated embodiment the arm contacting element 70 includes a body and is adapted to be disposed on the actuator housing 60. In one embodiment the arm contacting element 70 is approximately cylindrical in shape. In other embodiments it can take the form of other geometric shapes, such as pyramids or rectangular boxes. When the arm contacting element 70 is adapted to be disposed on the actuator housing 60, its size and shape can be at least partially dependent on the size and shape of the actuator housing 60. For example, as illustrated, the size of the cylindrically shaped body of the arm contacting element 70 is slightly larger than at least a portion of the cylindrically shaped actuator housing 60.

In embodiments in which the arm contacting element 70 is adapted to be disposed on the actuator housing 10, the arm contacting element 70 can slide along at least a portion of the length of the actuator housing 60. In one embodiment one or more bushings can be disposed between the actuator housing 60 and the arm contacting element 70. In other embodiments other forms of bearings can be disposed between the actuator housing 60 and the arm contacting element 70. The arm contacting element 70 can also be axially preloaded. In the illustrated embodiment, shown in FIGS. 3, 4, and 6, the arm contacting element 70 is axially preloaded in the approximate direction D. The axial preload can be created in a variety of ways, but in one embodiment springs are used. Alternatively, or additionally, the first and second arms 32, 34 can place an axial preload on the arm contacting element 70 either by contacting the arm contacting element 70 directly or by way of one or more intermediate components adapted to place the arm contacting element 70 under an axial preload.

In one embodiment the arm contacting element 70 can rotate. In the illustrated embodiment the arm contacting element 70 is adapted to rotate around the longitudinal axis L of the actuator housing 60. Each rotation of the arm contacting element 70 can coincide with movement of the arm contacting element 70 between the first and second positions, or where the arm contacting element 70 moves between more than two positions, the rotation can coincide with each such position. Rotation of the arm contacting element 70 can be in the clockwise direction, the counterclockwise direction, or a combination of the two directions.

The arm contacting element 70 can also include one or more prong receivers 72. In the illustrated embodiment the arm contacting element 70 includes eight prong receivers 72. Typically, the number of prong receivers 72 on the arm contacting element 70 will correspond with the number of locking prongs 62 on the actuator housing 60 because the prong receivers 72 can be configured to receive the locking prongs 62. However, it is not necessary that the number of prong receivers 72 equal the number of locking prongs 62. Further, similar to the locking prongs 62, the prong receivers 72 can be equally spaced apart around the shape of the arm contacting element 70, so in the illustrated embodiment the eight prong receivers 72 are equally spaced around the 360 degree perimeter of the arm contacting element 70. Each prong receiver 72 can have the same shape and size, but it is not necessary that each prong receiver 72 has the same shape and size.

The actuator housing 60 and the arm contacting element 70 can operate in conjunction with one another in order to move the first and second arms 32, 34 between the opened and closed positions, as well as any other positions in which the first and second arms 32, 34 can be positioned. In an exemplary embodiment, illustrated best in FIG. 8, the locking prongs 62 of the actuator housing 60 and the prong receivers 72 of the arm contacting element 70 are designed such that the prong receivers 72 can selectively contact the locking prongs 62. More specifically, as the prong receivers 72 move when the arm contacting element 70 is actuated, the prong receivers 72 can be selectively substantially aligned with the locking prongs 62 such that the prong receivers 72 engage the locking prongs 62 in the first position, which in turn places the first and second arms 32, 34 in the opened position, and then as the prong receivers 72 move again when the arm contacting element 70 is actuated, the prong receivers 72 can be selectively substantially aligned between the locking prongs 62 such that the prong receivers 72 do not engage the locking prongs 62 in the second position, which in turn places the first and second arms 32, 34 in the closed position.

Figure 8:
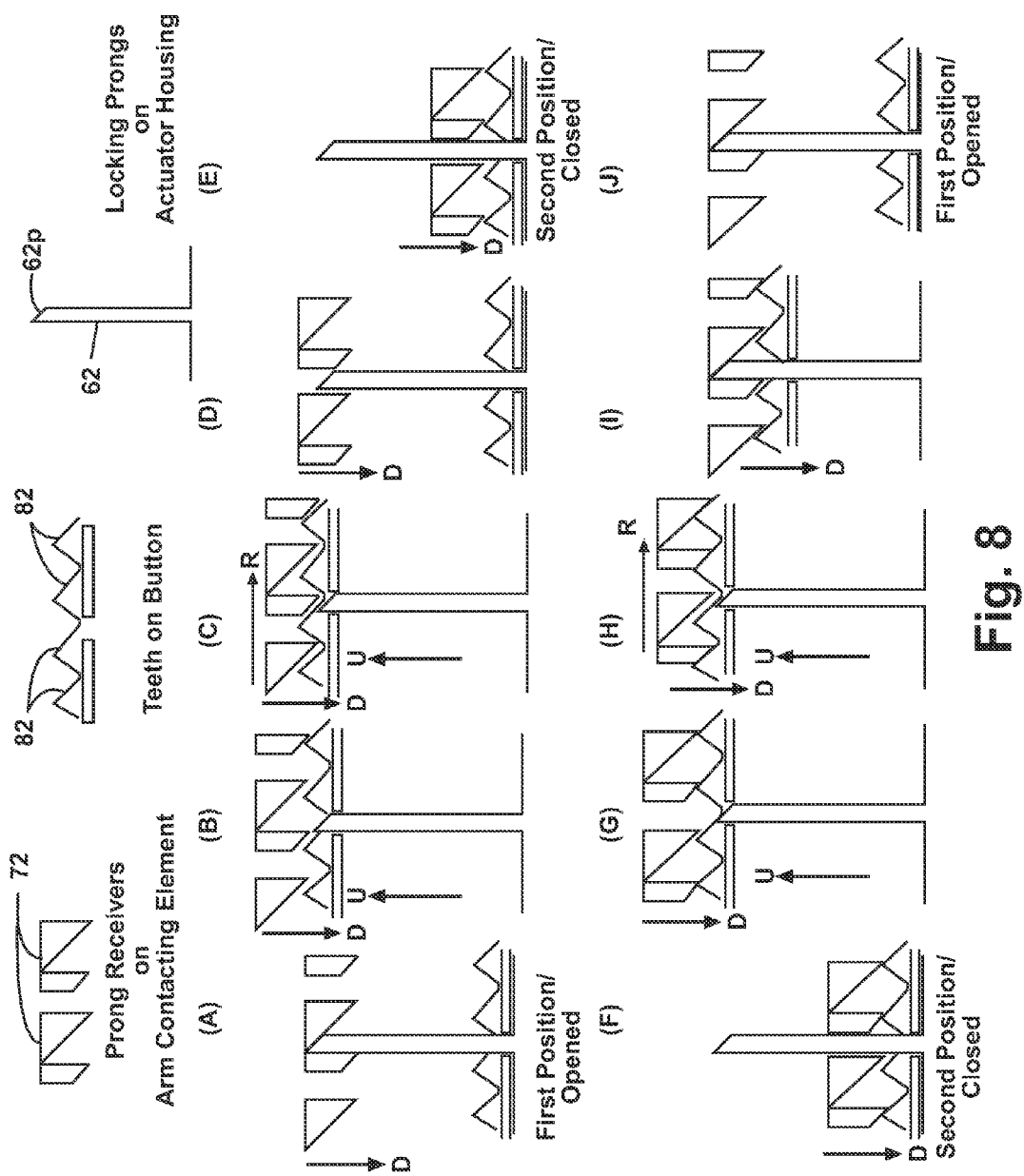
FIG. 8 is a schematic progression view of the system of FIG. 1 illustrating the progression of the system between the opened and closed positions depicted in FIGS. 1 and 2.

The various stages depicted in FIG. 8 demonstrate the interaction between the actuator housing 60 and the arm contacting element 70 as the arm contacting element 70 moves from the first position to the second position and then back again to the first position. In particular, each of the first and second positions, as well as six intermediate positions that demonstrate sample locations of the components as the arm contacting element 70 is moved between the first and second positions, is illustrated. When the arm contacting element 70 is in the first position, even though the axial preload is applying force on the arm contacting element 70 in the approximate direction D, the locking prongs 62 of the actuator housing 60 prevent the arm contacting element 70 from traveling further in the approximate direction D because the prong receivers 72 are substantially aligned such that they engage the locking prongs 62. To move the arm contacting element 70 toward the second position, a force in an approximate direction U that is greater than the force in the approximate direction D can be applied. When the force in the approximate direction U is applied, the arm contacting element 70 can first move in the approximate direction U, at least until a distal portion 70d of the arm contacting element 70 is more proximal to the base 20 than proximal portions 62p of the locking prongs. Once the distal portion 70d of the arm contacting element 70 is more proximal to the base 20 than the proximal portions 62p of the locking prongs 62, the arm contacting element 70 can move in a second approximate direction R, which as illustrated in FIGS. 6 and 8 is rotationally counterclockwise and generally perpendicular to the approximate direction D, to move a desired amount such that the prong receivers 72 are no longer substantially aligned to engage the locking prongs 62, i.e. the second position. In an exemplary embodiment the arm contacting element 70 travels approximately 2.5 centimeters between the first and second positions. Although in the illustrated embodiment the arm contacting element 70 rotates to move in the second approximate direction R, in other embodiments the arm contacting element 70 can move in another fashion. When the prong receivers 72 are no longer substantially aligned to engage the locking prongs 62, the force in the approximate direction U can be reduced or removed such that, because of the axial preload, the arm contacting element 70 again moves in the approximate direction D. As the arm contacting element 70 moves in the approximate direction D, the prong receivers 72 can slide past the locking prongs 62 and toward the second position. As illustrated, in the second position the locking prongs 62 are situated in between the prong receivers 72. At the second position, the arm contacting element 70 can be configured to stop at a desired location in a number of different ways. In one embodiment a third element adapted to prevent further movement of the arm contacting element 70 can be part of the actuation element 50. In another embodiment the arm contacting element 70 itself can be configured to stop at a desired location. In still another embodiment the button 80 can be adapted to prevent further movement of the arm contacting element 70, which will be discussed in further detail below.

To return the arm contacting element 70 back to the first position, a force in the approximate direction U can be placed on the arm contacting element 70 to overcome the force from at least the axial preload in the approximate direction D. This causes the arm contacting element 70 to move in the approximate direction U. The force in the approximate direction U can be applied at least until a distal portion 70d of the arm contacting element 70 is more proximal to the base 20 than proximal portions 62p of the locking prongs 62. Once the distal portion 70d of the arm contacting element 70 is more proximal to the base 20 than the proximal portions 62p of the locking prongs 62, the arm contacting element 70 can move a desired amount in the second approximate direction R such that the prong receivers 72 are once again substantially aligned to engage the locking prongs 62, i.e. the first position. In an exemplary embodiment the arm contacting element 70 travels approximately 2.5 centimeters between the second and first positions. When the prong receivers 72 are substantially aligned to engage the locking prongs 62, the force in the approximate direction U can be reduced or removed such that because of the axial preload the arm contacting element 70 again moves in the approximate direction D. As the arm contacting element 70 moves in the approximate direction D, the prong receivers 72 can engage the locking prongs 62 and the arm contacting element 72 can again be located in the first position.

While the embodiment illustrated in FIG. 8 includes six intermediate positions that represent stop-action, or freeze-frame, locations of the arm contacting element 70 as it moves between the first and second positions, it is understood that in other embodiments the positions of the actuator housing 60 and the arm contacting element 70 can be maintained at these locations, as well as any other location between and even beyond the first and second positions, by incorporating knowledge of those skilled in the art. By way of a non-limiting example, to the extent that other positions for the arm contacting element 70 and the first and second arms 32, 34 are desired, one way in which such other positions can be attained is to locate the prong receivers 72 at various heights along the body of the arm contacting element 70. In some embodiments this can include using more prong receivers 72 and/or locking prongs 62, while in other embodiments this can include using the same number or even less prong receivers 72 and/or locking prongs 62. Further, although as described when the arm contacting element 70 is in the first position the first and second arms 32, 34 are in the opened position and when the arm contacting element 70 is in the second position the first and second arms 32, 34 are in the closed position, features can be included that alter the illustrated system 10. For example, lever extensions can be associated with the arm contacting element 70. A person skilled in the art will recognize that lever extensions can allow the first and second arms 32, 34 to be in the closed position when the arm contacting element 70 is in the first position and in the opened position when the arm contacting element 70 is in the second position.

The force to move the arm contacting element 20 in the approximate direction U can be provided in a number of different manners, but in an exemplary embodiment the button 80 can be a mechanism used to provide such force. More specifically, the button 80 can be operable to releasably move the arm contacting element 70 between the first and second positions, as well as any other desired positions of the arm contacting element 70. In one embodiment the button 80 can be located distal of the arm contacting element 70. In another embodiment the button 80 can be in contact with the rim 64 of the actuator housing 60 such that an initial position of the button 80 can be maintained so that the button 80 does not fall off the actuator housing 60. In still another embodiment the button 80 can include a feature to allow it to be contacted and held in a distal-most position by the rim 64 of the actuator housing 60.

Similar to both the actuator housing 60 and the arm contacting element 70, the button 80 can be a variety of different shapes and sizes. In an exemplary embodiment the button 80 is adapted to receive a particular object, for example, the bicycle wheel 100. In the illustrated embodiment the button 80 includes a body and is adapted to be disposed on the actuator housing 60. In one embodiment a proximal portion 80p of the button 80 is approximately cylindrical in shape while at least a portion of a distal portion 80d is approximately a disc-like shape. In other embodiments the button 80 can be a single geometric shape, or alternatively, it can take the form of multiple geometric shapes. In an exemplary embodiment the distal portion 80d of the button 80 can be broader than the proximal portion 80p. Similar to the arm contacting element 70, when the button 80 is adapted to be disposed on the actuator housing 60, its size and shape can be at least partially dependent on the size and shape of the actuator housing 60. For example, as illustrated, the size of the approximately cylindrically shaped proximal portion 80p of the button 80 is slightly larger than at least a portion of the cylindrically shaped actuator housing 60. Further, the size and shape of the button 80 can also be at least partially dependent on the size and shape of the arm contacting element 70. In an exemplary embodiment the size and shape of the button 80 is such that the button 80 can engage the arm contacting element 70 to place the force in the approximate direction U on the arm contacting element 70. In one embodiment the diameter of the button 80 is approximately in the range of 5 to 15 centimeters. In the illustrated embodiment the diameter of the button 80 is approximately 9.5 centimeters.

In embodiments in which the button 80 is adapted to be disposed on the actuator housing 60, the button 80 can slide along at least a portion of the length of the actuator housing 60. In one embodiment one or more bushings can be disposed between the actuator housing 60 and the button 80. In other embodiments other forms of bearings can be disposed between the actuator housing 60 and the button 80.

Another feature of the button 80 can be that it is stable in least two planes, as previously described with respect to the actuation element 50 as a whole. In the illustrated embodiment the button 80 is stable in at least two planes because it is stable in the first plane that runs through the longitudinal axis L of the actuator housing 60, and it is stable in the second plane that is perpendicular to the longitudinal axis L of the actuator housing 60. In one embodiment a restraint can be associated with the button 80 to make it stable in at least two planes.

The button 80 can also include one or more engagement elements, which are adapted to contact the arm contacting element 70 to assist with moving the arm contacting element 70 in the approximate direction U. In an exemplary embodiment the one or more engagement elements can be adapted to move the arm contacting element 70 between the first and second positions. In one embodiment the one or more engagement elements include a plurality of teeth 82. The plurality of teeth 82 can be located anywhere on the button 80, but in one embodiment the plurality of teeth 82 are located on the proximal portion 80p of the button 80. The plurality of teeth 82 can be operable to engage the prong receivers 72 of the arm contacting element 70. In the illustrated embodiment the plurality of teeth 82 are sixteen teeth. The number of teeth 82 does not have to be dependent on the number of locking prongs 62 or prong receivers 72, but in a preferred embodiment there are two teeth 82 for every prong receiver 72. The teeth 82 can be equally spaced apart around the shape of the button 80, so in the illustrated embodiment the sixteen teeth are equally spaced around the 360 degree perimeter of the proximal portion 80p of the button 80. Each tooth 82 can have the same shape and size, but it is not necessary that each tooth 82 has the same shape and size. The one or more engagement elements can also include a plurality of alignment prong guides 84. The plurality of alignment prong guides 84 can be located anywhere on the button 80, but in one embodiment the plurality of alignment prong guides 84 are located on the proximal portion 80p of the button 80, distal of the plurality of teeth 82. The plurality of alignment prong guides 84 can be operable to allow and/or assist the alignment prongs 62 in passing through a space between each of the alignment prong guides 84. The space between each of the alignment prong guides 84 can be substantially aligned with a space between the prong receivers 72. In the illustrated embodiment the plurality of alignment prong guides 84 are eight alignment prong guides 84. The number of alignment prong guides 84 does not have to be dependent on the number of locking prongs 62, prong receivers 72, or teeth 82, but in a preferred embodiment there is one alignment prong guide 84 for every prong receiver 72. The alignment prong guides 84 can be equally spaced apart around the shape of the button 80, so in the illustrated embodiment the eight alignment prong guides 84 are equally spaced around the 360 degree perimeter of the proximal portion 80p of the button 80. Each alignment prong guide 84 can have the same shape and size, but it is not necessary that each alignment prong guide 84 has the same shape and size.

In addition to illustrating the interaction between the actuator housing 60 and the arm contacting element 70 as the arm contacting element 70 moves from the first position to the second position and then back again to the first position, the various stages depicted in FIG. 8 also illustrate the interaction between the button 80 and the arm contacting element 70 as the arm contacting element 70 moves from the first position to the second position and then back again to the first position. At least because the arm contacting element 70 is axially preloaded, the force in the approximate direction D causes the arm contacting element 70 to move in the approximate direction D, but when the arm contacting element 70 is in the first position, the prong receivers 72 engage the locking prongs 62 and the arm contacting element 70 is prevented from moving any further in the approximate direction D. To move the arm contacting element 70 toward the second position, a force in the approximate direction U can be applied by moving the button 80 from the initial position, in the approximate direction U, to contact the arm contacting element 70. By way of non-limiting example, one way in which the force in the approximate direction U can be applied is by pushing a bicycle wheel in the approximate direction U into the button 80. The force in the approximate direction U is greater than the force in the approximate direction D, which allows the button 80 to move the arm contacting element 70 in the approximate direction U to disengage the prong receivers 72 from the locking prongs 62. In the illustrated embodiment the plurality of teeth 82 on the button 80 engage the prong receivers 72 on the arm contacting element 70. The arm contacting element 70 can then move a desired amount in the second approximate direction R such that the prong receivers 72 are no longer substantially aligned to engage the locking prongs 62, i.e. the second position. As the arm contacting element 70 travels between the first and second positions, the button 80 at least maintains the force in the approximate direction U enough to prevent the prong receivers 72 from engaging the locking prongs 62 during rotational movement of the arm contacting element 70. When the prong receivers 72 are no longer substantially aligned to engage the locking prongs 62, the force in the approximate direction U can be reduced or removed and the button 80 can move distally toward its initial position. In one embodiment the button 80 returns to the initial position after each interaction with the arm contacting element 70. In the illustrated embodiment, when the arm contacting element 70 is in the second position, the button 80 returns to the initial position and the prong receivers 72 of the arm contacting element 70 contacts the plurality of teeth 82 of the button 80 such that the plurality of teeth 82 prevent the arm contacting element 70 from moving past the second position. In such an instance, the prong receivers 72 on the arm contacting element 70 can either remain in contact with the button 80 as the button 80 travels to the initial position, or the arm contacting element 70 can move to the second position without the prong receivers 72 maintaining contact with the plurality of teeth 82 on the button 80 as the button 80 returns to the initial position.

To return the arm contacting element 70 back to the first position, the force in the approximate direction U can again be applied by moving the button 80 from the initial position in the approximate direction U. Again, one way in which the force in the approximate direction U can be applied is by pushing a bicycle wheel in the approximate direction U into the button 80. The force in the approximate direction U is greater than the force in the approximate direction D, which allows the button 80 to move the arm contacting element 70 in the approximate direction U. In the illustrated embodiment the plurality of teeth 82 on the button 80 engage the prong receivers 72 on the arm contacting element 70. The force in the approximate direction U can be applied at least until the distal portion 70d of the arm contacting element 70 is more proximal to the base 20 than the proximal portions 62p of the locking prongs 62. Once the distal portion 70d of the arm contacting element 70 is more proximal to the base 20 than the proximal portions 62p of the locking prongs 62, the arm contacting element 70 can move a desired amount in the second approximate direction R such that the prong receivers 72 are once again substantially aligned to engage the locking prongs 62, i.e. the first position. When the prong receivers 72 are substantially aligned to engage the locking prongs 62, the force in the approximate direction U can be reduced or removed and the button 80 can move distally toward its initial position.

Although in the illustrated embodiment the arm contacting element 70 and the button 80 are separately disposed on the actuator housing 60, in another embodiment the arm contacting element 70 and the button 80 can form a rotatable locking element. The rotatable locking element can be disposed on the actuator housing 60, and in an exemplary embodiment the rotatable locking element can be operable to rotate around the longitudinal axis L of the actuator housing 60.

In one embodiment the actuation element 50 can be made from a single material. Thus, the actuator housing 60, the arm contacting element 70, and the button 80 can all be made from the same material. In other embodiments multiple materials can be used to make any individual component or all of the components of the actuation element 50. In an exemplary embodiment the actuator housing 60, the arm contacting element 70, and the button 80 are all made of plastic. In another embodiment the actuator housing 60, the arm contacting element 70, and the button 80 are all made of aluminum. In another exemplary embodiment the distal portion 80d of the button 80 can have one or more softer materials disposed on at least a portion of it. For example, a pad 86 can be placed over at least a portion of the distal portion 80d of the button 80 to protect both the bicycle wheel 100 and the button 80 from becoming damaged during use. In one embodiment the pad 86 is made of urethane. In another embodiment the pad 86 is made of ABS thermoplastic. Other embodiments can incorporate softer materials, such as urethane, ABS thermoplastic, and/or rubber, on other components of the actuation element 50, whether for aesthetics, security, functionality, or otherwise.

Other features that can be desirable for a holding system can also be included in the system 10. By way of a non-limiting example, in one embodiment a locking mechanism can be associated with the system 10. The locking mechanism can provide a security measure that prevents the first and second arms 32, 34 from moving to the opened position, or any other position other than the closed position, until the locking mechanism is unlocked. In one embodiment a lock-and-key system is incorporated into the system 10 that prevents the button 80 from sliding in the approximate direction U until the lock-and-key system is unlocked. In another embodiment a coded lock is incorporated into the system 10 that prevents the button 80 from sliding in the approximate direction U until the correct code is entered to unlock the coded lock. It is understood that even though the example of locking mechanisms was used to demonstrate a feature that can be desirable for a holding system, other such features can also be incorporated into the system 10.

The system 10 can be manufactured using a number of different methods, and the order in which the steps of the method can be carried out are easily adaptable based, at least in part, on the design and intended use of the system 10. The components themselves, such as the base 20, the first and second arms 32, 34, the actuator housing 60, the arm contacting element 70, and the button 80, can be made in a variety of different ways, but in an exemplary embodiment they are injection molded. As for constructing the system 10, in an exemplary embodiment a sleeve can be configured to receive the button 80. The sleeve can be of a similar shape as the button 80 and can be at least big enough to receive the proximal portion 80p of the button 80. In one embodiment the sleeve can rest on at least a portion of the distal portion 80d of the button 80 and thus that portion of the distal portion 80d is not disposed in the sleeve, but in another embodiment the sleeve can be sized to receive even the largest portion of the button 80, which is typically the distal portion 80d. In an exemplary embodiment the sleeve is cylindrical and its diameter is approximately 0.1 to 0.5 centimeters bigger than the diameter of the proximal portion 80p of the button 80. The actuator housing 60 can be disposed in the sleeve, and in one embodiment a portion of the actuator housing 60 can be associated with and disposed inside at least a portion of the proximal portion 80p of the button 80. The arm contacting element 70 can also be disposed in the sleeve, and in one embodiment the arm contacting element 70 can be associated with and disposed outside of the actuator housing 60. Once the button 80, actuator housing 60, and arm contacting element 70 are associated with each other, the sleeve can be removed and the holding side 24 of the base 20 can be coupled to the actuator housing 60. The first and second arms 32, 34 can be mounted to the holding side 24 of the base 20, either before or after the actuator housing 60 is coupled to the holding side 24 of the base 20. Alternatively, the first and second arms 32, 34 can be coupled to the actuator housing 60. In other embodiments the size of the sleeve can be adjusted such that the base 20 can be coupled to the actuator housing 60 earlier in the method of manufacture.

Once manufactured in full, the overall size of the system 10 will depend, at least in part, on the size of the various components as well as the method of manufacture carried out. As illustrated in FIG. 1, in an exemplary embodiment the approximate length $\lambda$ of the system 10 in the opened position, measured from the outermost portions 32o, 34o of the first and second arms 32, 34, is 35.5 centimeters, the approximate height $\eta$ of the system 10 in the opened position, measured from the attachment side 22 of the base 20 to the distal portion 32p, 34p of the first and second arms 32, 34, is 23 centimeters, and the approximate width $\chi$ of the system 10 in the opened position is 9.5 centimeters. The width $\chi$ of the system 10 is measured from the widest portion of the system 10, which is typically the diameter of either the distal portion 80d of the button 80 or the base 20, or whatever the equivalent measurement of the diameter is when these components are not cylindrical or circular in shape. In the illustrated embodiment the width $\chi$ of the system 10 is the diameter of the distal portion 80d of the button 80 because that portion of the system 10 is longer than the diameter of the base 20. As illustrated in FIG. 2, in the same exemplary embodiment the approximate length $\lambda$ of the system 10 in the closed position, measured from the outermost portions 32o, 34o of the first and second arms 32, 34 unless the diameter/length of the base 20 is longer, is 14 centimeters, the approximate height $\eta$ of the system 10 in the closed position, measured from the attachment side 22 of the base 20 to the distal portions 32d, 34d of the first and second arms 32, 34, is 24.5 centimeters, and the approximate width $\chi$ of the system 10 in the closed position is 9.5 centimeters. Generally the width $\chi$ of the system 10 does not change between the opened and closed positions. In the illustrated embodiment the width $\chi$ of the system 10 is the diameter of the distal portion 80d of the button 80 because that portion of the system 10 is longer than the diameter of the base 20. Further, in the exemplary embodiment a space S between the distal portion 80d of the button 80 and the distal portions 32d, 34d of the arms 32, 34 in the closed position is approximately 7 centimeters. In some embodiments the space S is suitable for any bicycle wheel, including bicycles wheels with an approximate width up to and including 2.5 inches and specially designed "aero-wheels" with deep-dish profiles. Other bicycle wheels that are also suitable for use with the system 10 include, but are not limited, to 12 inch by 2 inch wheels, 16 inch by 2 inch wheels, 24 inch by 4 inch wheels, 26 inch by 4 inch wheels, and 29 inch by 4 inch wheels, where the first dimension represents a diameter of the wheel and the second dimension represents a width of the wheel.

Figure 9:
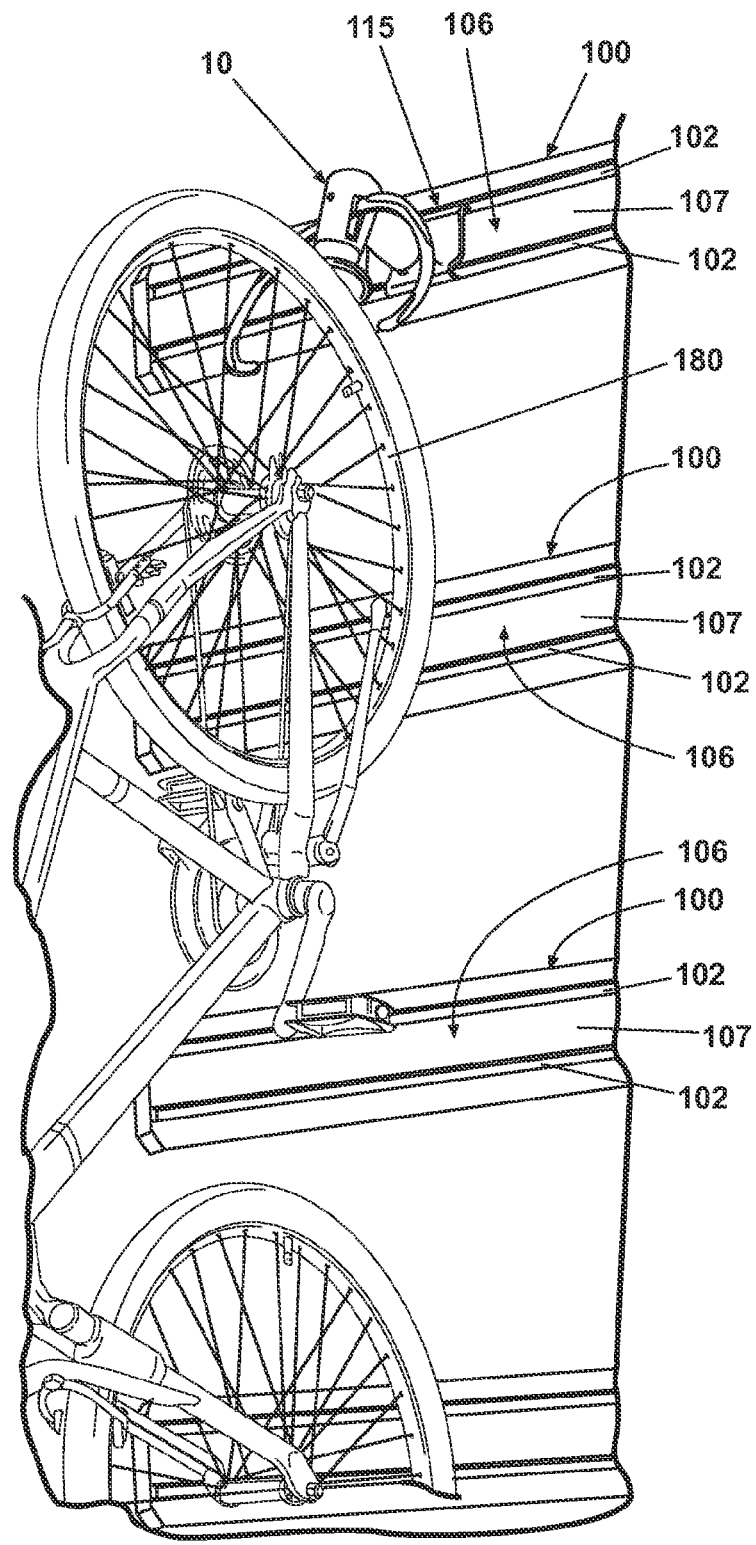
FIG. 9 is a partial perspective view of an actuatable holding system combined with a mounting bracket according to the invention secured on a slot track.
Figure 10:
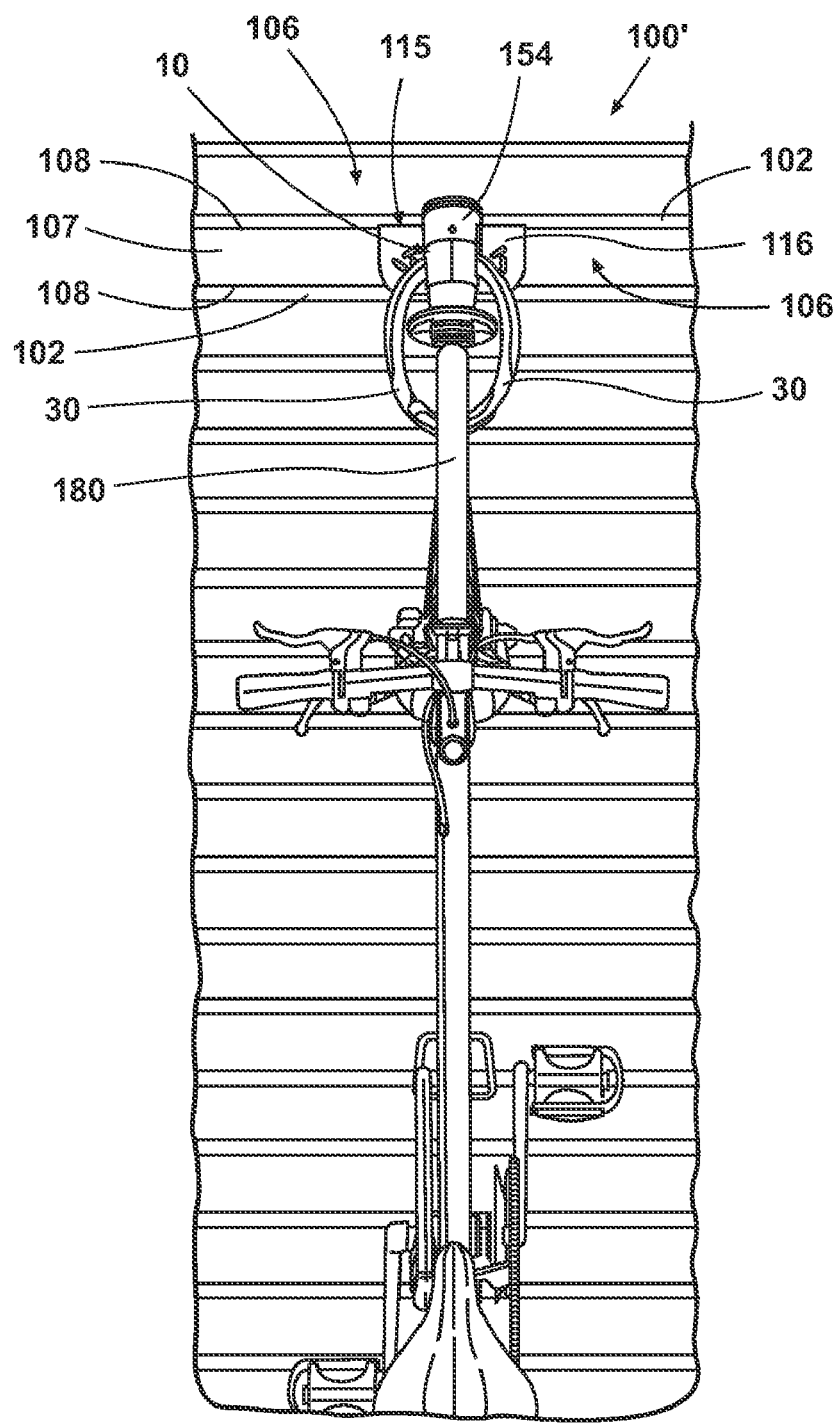
FIG. 10 is a partial plan view of an actuatable holding system combined with a mounting bracket according to the invention secured on a slot wall panel.

In another embodiment, the actuatable holding system 10 can be combined with a mounting bracket 115 to removably mount the actuatable holding system on a slot track 100 or a slot wall panel 100' as illustrated in FIGS. 9 and 10. Slot track 100 and slotwall panel 100' can have a plurality of generally "T" shaped slots 102 that can form a generally "T" shaped slat 106. Slotwall panels 100' and slot tracks 100 are described in detail in U.S. Pat. No. 6,811,043, Perkins et al., U.S. Pat. No. 7,055,703, Perkins et al., and U.S. Pat. No. 7,228,977, Perkins et al, (collectively the "Perkins patents") each assigned to the assignee of this application, and hereby incorporated by reference into this application. Slot track 100 can have two slots 102 that can form a slat 106. Slotwall panel 100' can have a plurality of slots 102 that can form a plurality of slats 106. One or more slotwall panels 100' can be affixed to the wall of a building to removably support a plurality of storage devices as illustrated in above identified Perkins patents. Similarly, a plurality of slot tracks 100 can be affixed to the wall of a building. In addition to other storage devices as described in the Perkins patents, an actuatable storage system 10 can be coupled to a mounting bracket 115 arranged for secure mounting on a slot track 100 or a slotwall panel 100' for storing objects that can include, but are not limited to, bicycles as illustrated in FIGS. 9 and 10.

Figure 11A:
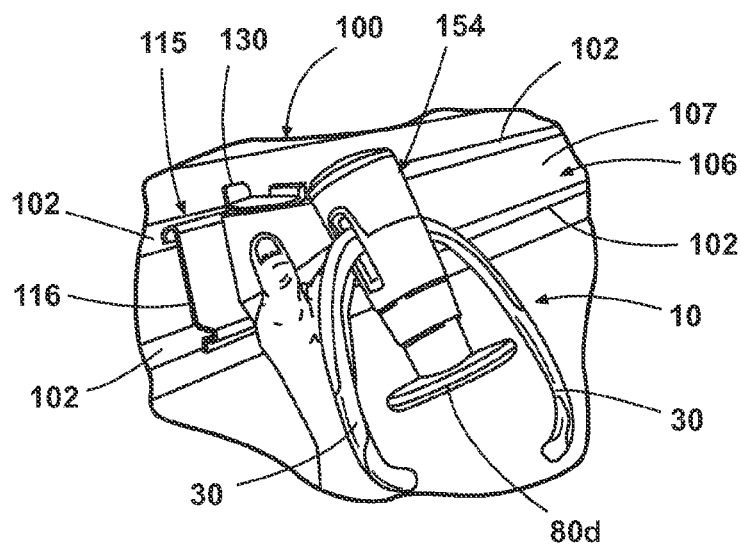
FIG. 11A is a partial perspective view of the actuatable holding system and mounting bracket of FIG. 9 being installed on a slot track.
Figure 11B:
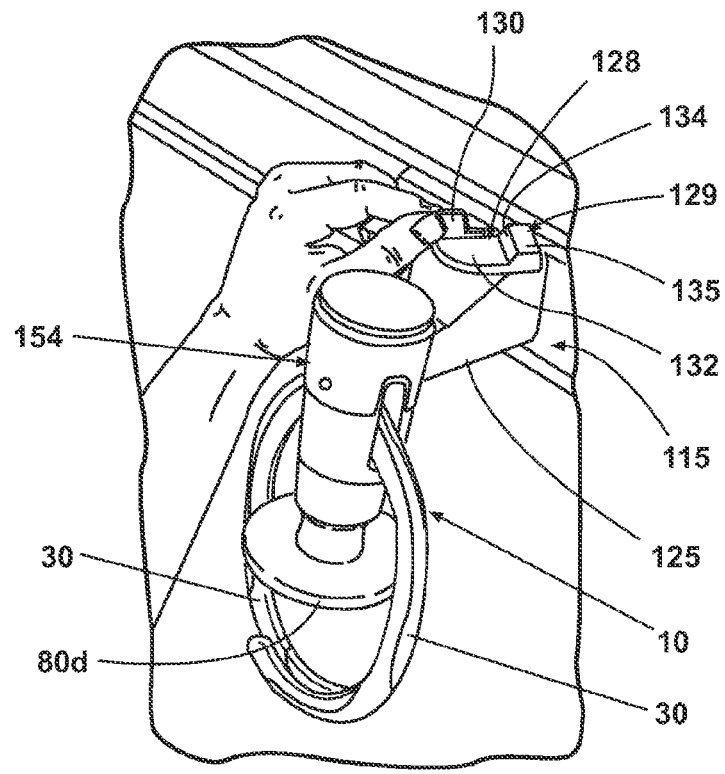
FIG. 11B is a partial perspective view of the actuatable holding system and mounting bracket of FIG. 9 being secured to a slot track.
Figure 12A:
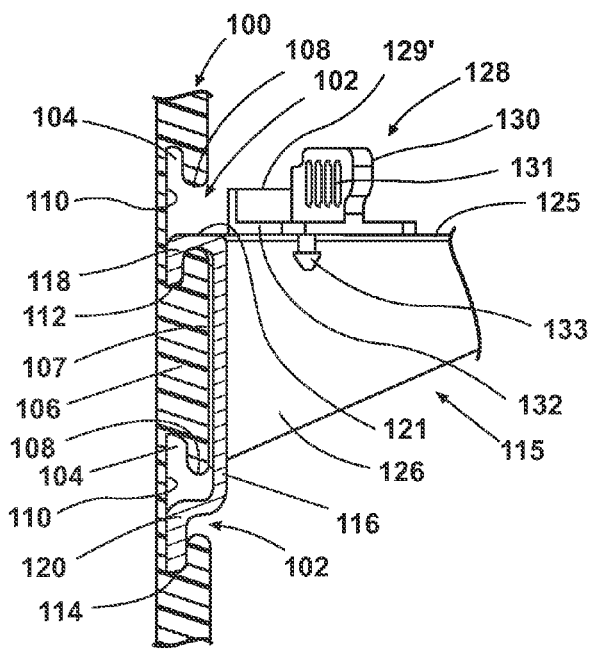
FIG. 12A is a partial side view illustrating a mounting bracket according to the invention "unlocked" on a slot track.
Figure 12B:
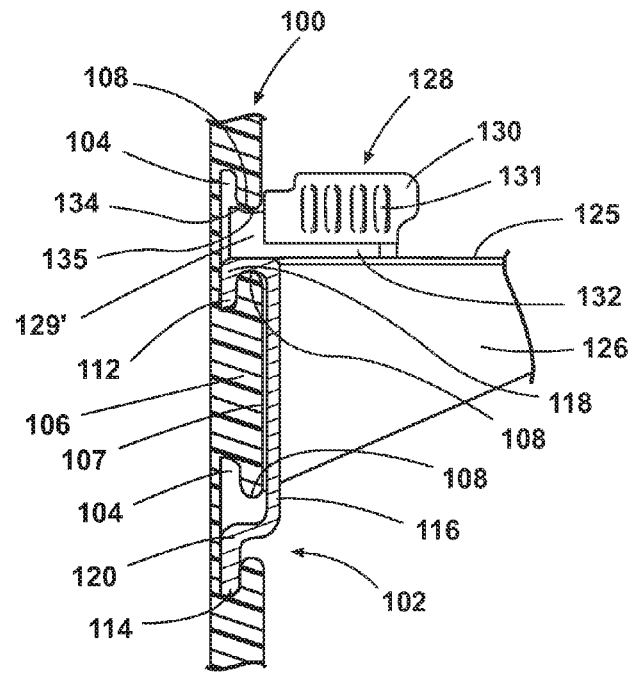
FIG. 12B is a partial side view illustrating a mounting bracket according to the invention "locked" on a slot track.
Figure 13B:
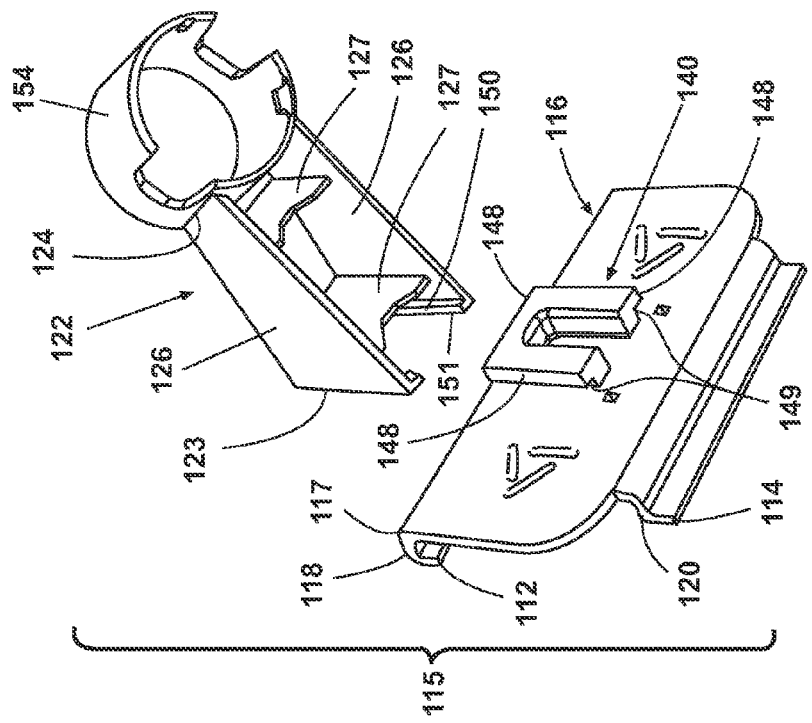
FIG. 13B is a partial exploded perspective view of a mounting bracket according to the invention.
Figure 13A:
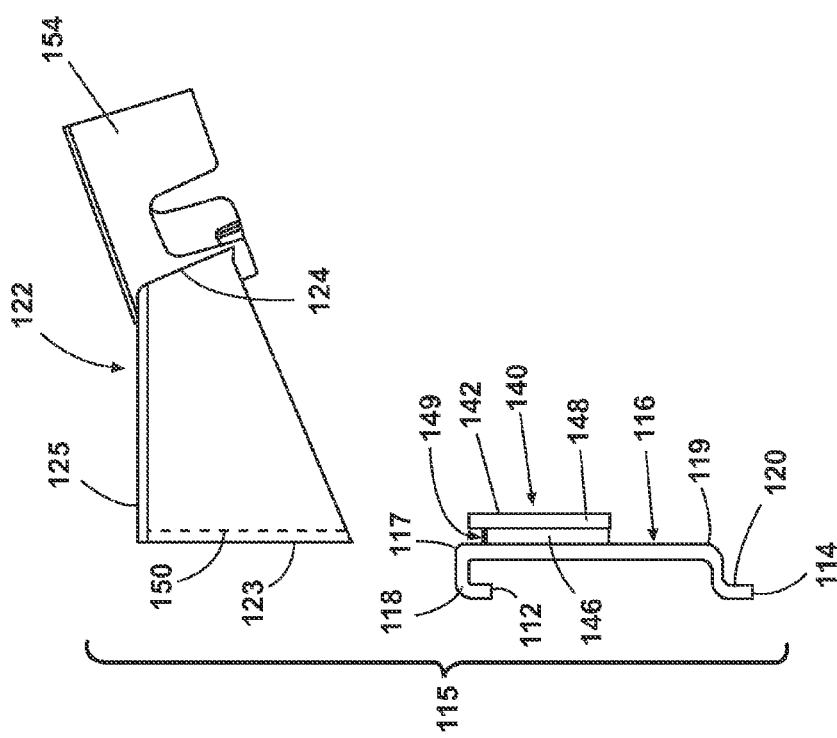
FIG. 13A is a partial exploded side view of a mounting bracket according to the invention.

Turning to FIGS. 11-13 one embodiment of a mounting bracket 115 that can be used with an actuatable holding system 10 can be seen in greater detail. Referring to FIGS. 13A and 13B, partial exploded views illustrating the attachment of storage device connector 122 to support surface 116 to form mounting bracket 115 can be seen. Mounting bracket 115 can include a lever lock arrangement 128 shown in FIGS. 11A, 11B, 12A and 12B, but not shown in FIGS. 13A and 13B. Support surface 116 can include a "J" shaped hook 118 extending from one edge 117 of support surface 116 and another "J" shaped hook 120 extending from the other edge 119 of support surface 116. "J" shaped hook 118 and "J" shaped hook 120 can both open in the same downward direction and can be dimensioned to engage adjacent slots 102 as illustrated in FIGS. 12A and 12B. Slots 102 can have undercut sidewalls 104 that, with bottom wall 110 can form a generally "T" shaped slot that form a generally "T" shaped slat 106 having a face 107 defined by slat edges 108 all as described in detail in the Perkins patents incorporated by reference above. "J" shaped hook 118 can engage one edge 108 of a slat 106 with the distal end 112 extending into the undercut sidewall 104. Similarly, "J" shaped hook 120 can have a distal end 114 that can extend into undercut sidewall 104. Those skilled in the art will understand the distal ends (112 and 114) can be arranged to extend into and engage the bottom of undercut sidewall 104 as illustrated in FIGS. 12A and 12B, or can be arranged so that the "J" shaped hooks engage edges 108 of slat 106 without the distal ends 112 and 114 engaging the bottom of undercut sidewall 104 (not illustrated), as desired.

Referring to FIGS. 13A and 13B, support surface 116 can have a mounting post 140 projecting from the support surface 116 that can have a distal end 142. Mounting post 140 can have a top surface 144 and side surfaces 146 extending between support surface 116 and distal end 142. A generally "U" shaped flange 148 can extend outwardly from top surface 144 and side surfaces 146 generally parallel to support surface 116 and forming a generally "U" shaped channel 149 between generally "U" shaped flange 148 and support surface 116. Storage device connector 122 can have a top wall 125 and side walls 126 that can extend from one end 123 to a second end 124. One or more ribs 127 can be provided extending between the inside of side walls 126 and the under side of top wall 125 as desired to make storage device connector 122 rigid. End 123 of storage device connector 122 can be substantially open except for an inturned generally "U" shaped flange 150 extending into the open end 123 generally perpendicular to top wall 125 and side walls 126. Storage device connector 122 can be attached to support surface 116 to form mounting bracket 115 by inserting generally "U" shaped flange 150 into generally "U" shaped channel 149. Side walls 126 can extend beyond the side surfaces 146 of mounting post 140 and generally "U" shaped flange 150 can include a detent 151 at the ends of generally "U" shaped flange 150 adjacent to bottom of mounting post 140 below the generally "U" shaped channel 149. The detents 151 can be arranged to engage the bottom surface of mounting post 140 at the bottom end of side surfaces 146 to secure storage device connector 122 to support surface 116.

For a mounting bracket 115 to be used in combination with an actuatable holding system 10, a collar 154 can be coupled to end 124 of storage device connector 122. Collar 154 can replace base 20 described above in connection with FIGS. 1-4 so that one or more arms 30 of actuatable holding system 10 can be attached to collar 154 in a manner similar to the attachment of one or more arms 30 to base 20 as described above. As illustrated in FIGS. 9, 11 and 13 collar 154 can be arranged to project form storage device connector 122 at an upward angle relative to top surface 125 to allow a bicycle wheel 180 to engage the actuatable holding system 10 generally along a radius of the bicycle wheel 180. Support surface 116 and storage device connector 122 and collar 154 can be formed of plastic resin material that can be glass filled nylon resin material. Other suitable materials can be acrylonitrile butadiene styrene (ABS) or structural foam.

Bracket 115 can be secured to a slot track 100 or to a slotwall panel 100' with a lever lock 128 as illustrated in FIGS. 11 and 12. Lock 128 can be rotatably mounted on top wall 125 of storage device connector 122 adjacent "J" shaped hook 118. Lock 128 can have a locking member 129 and an operator 130 that can be positioned on a base 132 that can be pivotally mounted to top wall 125 at pivot 133. Pivot 133 can be connected to lock 128 or can be a separate pivot that can be a threaded fastener as is well known in the art. Locking member 129 can be a generally rectangular block 129' that can be connected to base 132 and operator 130 can be an upstanding element or lever 130' from base 132. Base 132 can be pivotally mounted to top wall 125 at pivot 133 so that in one position generally rectangular block 129' can be positioned in front of slot 102 as illustrated in FIG. 12A (the unlocked position) and, when rotated counterclockwise, can be positioned in slot 102 above "J" shaped hook 118 as illustrated in FIG. 12B (the locked position). As can be seen by referring to FIG. 12B generally rectangular block 129' can be sized so that "J" shaped hook 118 and locking portion 129 substantially fill slot 102 and can thereby prevent support surface 116 and storage device connector 122 from moving relative to slot track 100 or slotwall panel 100'. Generally rectangular block 129' can have a top wall 135 that can have a bevel edge 134 facing operator 130 to facilitate insertion of generally rectangular block 129' into slot 102 as operator 130 is rotated in the counterclockwise direction to engage lock 128 with the bevel edge 134 engaging edge 108 to "cam" generally rectangular block 129' into slot 102 above "J" shaped hook 118 as lever lock 128 is rotated and to help secure the lock in the locked position. Further, a portion of edge 117 of support surface 116 forming the base of "J" shaped hook 118 can be generally flat in the section adjacent to storage device connector 122 to provide a generally flat surface for base 132 to rotate over as base 132 is rotated counterclockwise to the locked position. As can be seen in FIGS. 12A and 12B operator 130 can have a plurality of ribs 131 for an operator to grasp operator 130 to move the lock to the locked or unlocked position as the case may be. Lever lock 128 can be formed of molded plastic material as desired.

Thus, a mounting bracket 115 can be securely attached to a slot track 100 or a slot wall panel 100' by hooking "J" shaped hook 118 over one edge 108 of a slat 106 and inserting "J" shaped hook 120 into an adjoining slot 102 until "J" shaped hooks 118 and 120 engage the slot track 100 or slot wall panel 100' as described above (see FIG. 11A). The user can grasp operator 130 and rotate lever lock 128 counterclockwise to insert locking member, generally rectangular block 129', into slot 102 above "J" shaped hook 118 securing mounting bracket 115 to the slot track 100 or slot wall panel 100'. When mounting bracket 115 is combined with an actuatable holding system 10 as illustrated in FIGS. 9-11 the secure mounting of mounting bracket 115 can assure that installing and removing a bicycle as illustrated in FIGS. 9 and 10 will not dislodge mounting bracket 115 from slot track 100 or slot wall panel 100'. In use for hanging a bicycle, a user can press a bike tire 180 against distal portion 80d of actuatable holding system 10 to cause arms 30 to close and engage the bike tire 180 (see FIG. 10). To remove the bicycle from the actuatable holding system the user can lift the bike so the bike tire 180 engages and depresses distal end 80d to cause arms 30 to open for release the bike tire 180 all as described above in detail. As described above, collar 154 can be angled relative to support device connector 122 so that actuatable holding system 10 can extend outwardly relative to slot track 100 or slot wall panel 100' as illustrated in FIG. 9 that can facilitate engaging distal end 80d with a bike tire 180.

Figure 14:
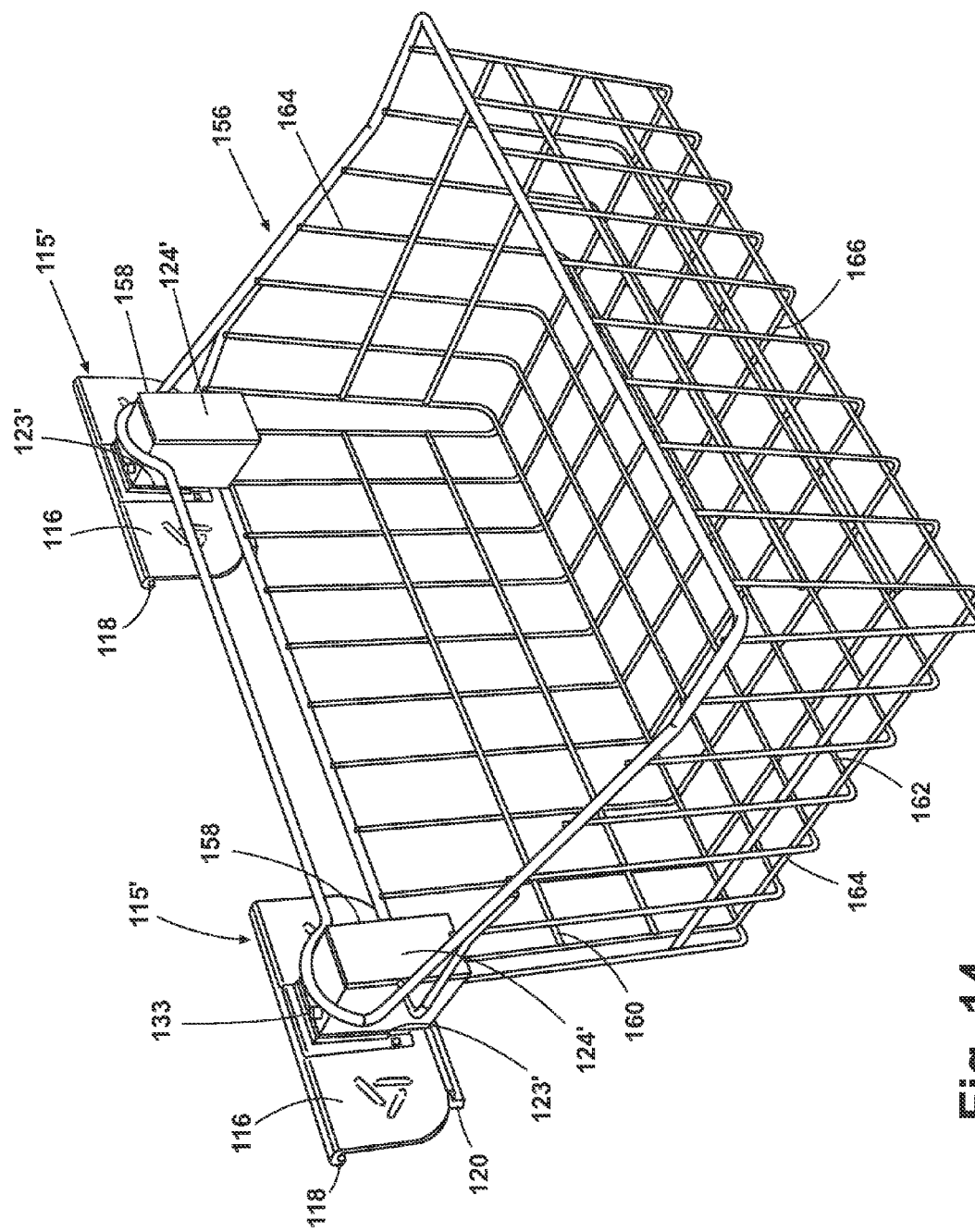
FIG. 14 is a perspective view of a mounting bracket according to the invention combined with a storage basket.
Figure 15:
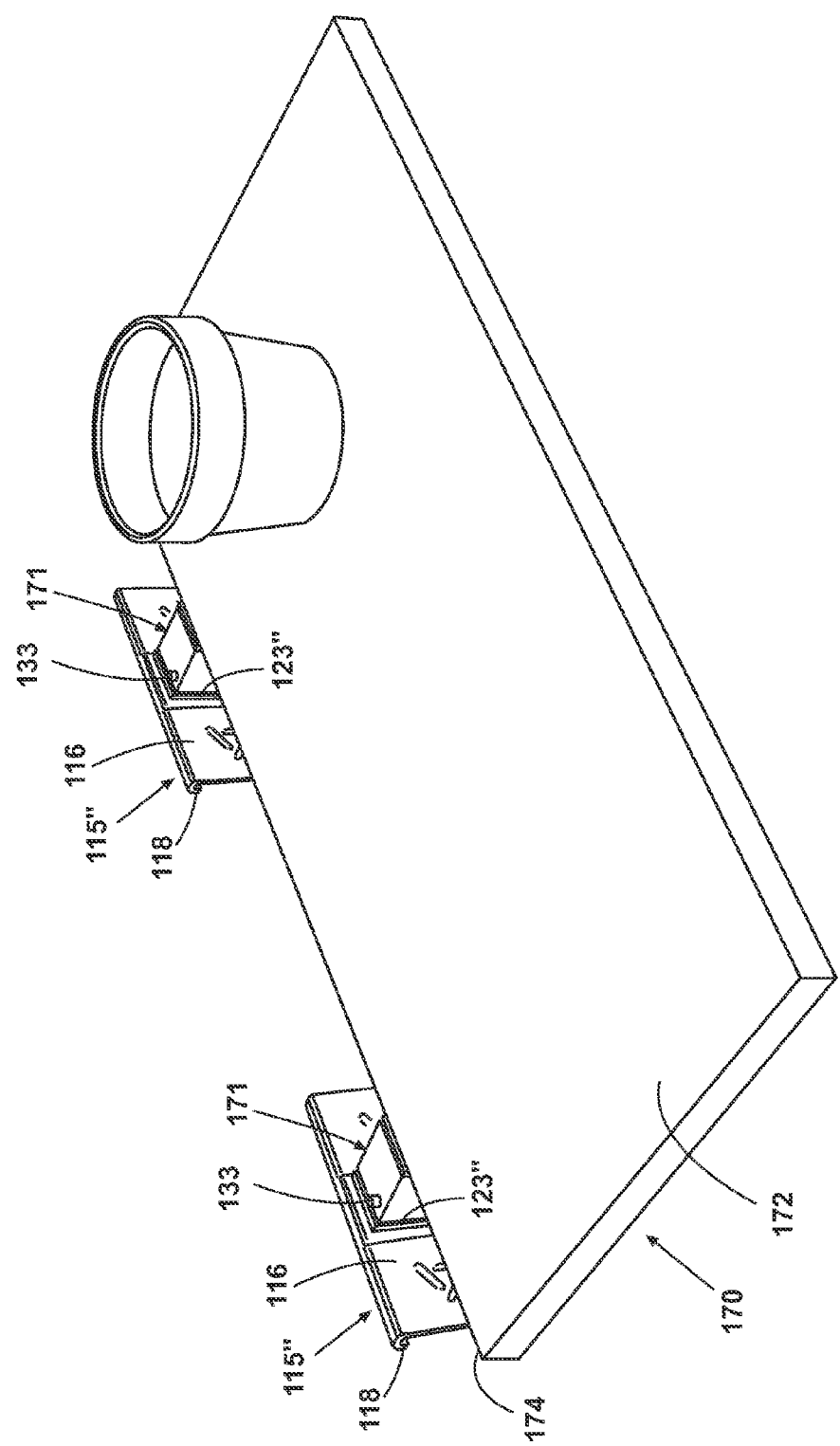
FIG. 15 is a perspective view of a mounting bracket according to the invention combined with a storage shelf

A mounting bracket similar to mounting bracket 115 can be combined with other storage devices as can be seen in FIGS. 14 and 15. As illustrated in FIG. 14 mounting brackets 115' can be provided for use with a storage basket 156. Storage basket 156 can have a rear wall 160, a bottom wall 162, side walls 164 and a front wall 160. Storage basket 160 can be a wire basket as shown in FIG. 14 or can be a storage basket having one or more solid walls if desired. Mounting brackets 115' can have a support surface 116 that can be similar to support surface 116 of mounting bracket 115 as described above. Mounting brackets 115' can have a storage device connector 158 that can be arranged to securely connect with storage basket 156 along rear wall 160 and can include a second end 124' to enclose storage device connector 158. Storage device connector 158 can include a first end 123' that can engage support surface 116 similar to storage device connector 122 as described above including an inwardly extending generally "U" shaped flange 150, not shown in FIG. 14. Thus, storage device connector 158 can be securely attached to support surface 116 in a similar manner to storage device connector 122 as described above. Further, storage device connector 158 can include a pivot 133 that can pivotally secure a lever lock 128 that can be similar to lever lock 128 illustrated in FIGS. 11 and 12. Mounting brackets 115' can be connected to storage basket 156 and storage basket 156 can be secured to a slot track 100 or a slot wall panel 100' (not shown in FIG. 14) in a manner similar to actuatable holding system 10 as described above by inserting "J" shaped hook 118 into a slot 102 and then inserting "J" shaped hook 120 into an adjoining slot 102 and allowing the "J" shaped hooks to engage the slat 106 and the undercut sidewalls 104 as described in detail above. Lever locks 128 (not shown in FIG. 14) can then be rotated counterclockwise as described above to secure storage basket 156 to the slot track 100 or slot wall panel 100' as described above in detail.

Referring to FIG. 15 mounting brackets 115" can be provided for use with a storage shelf 170. Storage shelf 170 can have a storage surface 172 that can be a storage surface or can be a work surface such as a space for potting plants and the like. Mounting brackets 115" can include a support surface 116 that can be similar to support surfaces 116 described above in connection with mounting brackets 115. Mounting brackets 115" can have a storage device connector 171 that can be arranged to securely connect with storage basket storage shelf 170 along rear surface 174 in a manner well known in the art. Storage device connector 171 can include a first end 123" that can engage support surface 116 similar to storage device connector 122 as described above including an inwardly extending generally "U" shaped flange 150, not shown in FIG. 15. Thus, storage device connector 171 can be securely attached to support surface 116 in a similar manner to storage device connector 122 as described above. Further, storage device connector 171 can include a pivot 133 that can pivotally secure a lever lock 128 that can be similar to lever lock 128 illustrated in FIGS. 11 and 12. Mounting brackets 115" can be connected to storage shelf 170 and storage shelf 170 can be secured to a slot track 100 or a slot wall panel 100' (not shown in FIG. 15) in a manner similar to actuatable holding system 10 as described above by inserting "J" shaped hook 118 into a slot 102 and then inserting "J" shaped hook 120 into an adjoining slot 102 and allowing the "J" shaped hooks to engage the slat 106 and the undercut sidewalls 104 as described in detail above. Lever locks 128 (not shown in FIG. 15) can then be rotated counterclockwise as described above to secure storage shelf 170 to the slot track 100 or slot wall panel 100' as described above in detail.

While the invention has been specifically described in connection with certain specific embodiments thereof, it is to be understood that this is by way of illustration and not of limitation, and the scope of the appended claims should be construed as broadly as the prior art will permit.

We claim:

1. A mounting bracket for removably mounting a storage device on a slot track including first and second spaced apart slots arranged to form a slat having a face with edges defined by the first and second slots, the first and second slots further having a bottom wall generally parallel to and spaced inwardly from the face of the slat having at least one undercut sidewall that forms at least one projecting slat edge projecting over the undercut sidewall, the mounting bracket comprising:
   a support surface;
   a first "J" shaped hook extending from one edge of the support surface, the first "J" shaped hook opening in a first direction to hook over the projecting slat edge of the at least one slat and into the undercut sidewall of the first slot of a slot track;
   a second "J" shaped hook extending from the opposite edge of the support surface, the second "J" shaped hook opening in the first direction to hook in the second slot and into the undercut sidewall of the second slot of a slot track;
   a storage device connector attached to the support surface at a first end and having a second end, the storage device connector comprising:
   top and side walls extending from the first end to the second end;
   a lock rotatably mounted on the top wall adjacent the first "J" shaped hook, the lock having a locking member and an operator, the lock being rotatable between locked and unlocked positions;
   wherein, in the locked position the locking member is positioned above the first "J" shaped hook and in the unlocked position the locking member is positioned adjacent the first "J" shaped hook.

2. The mounting bracket according to claim 1, wherein the lock further comprises a base rotatably mounted to the top wall, the locking member being positioned on a first portion of the base and the operator being positioned on a second portion of the base spaced from the locking member.

3. The mounting bracket according to claim 2, wherein the operator comprises an upstanding member connected to the second portion of the base and arranged to be gripped by a user.

4. The mounting bracket according to claim 3, wherein the locking member comprises generally rectangular block connected to the first portion of the base and sized to, with the first "J" shaped hook, fill the first slot of a slot track when the mounting bracket is installed on a slot track.

5. The mounting bracket according to claim 4, wherein the block includes a top wall and further wherein the top wall is beveled.

6. The mounting bracket according to claim 5, wherein the beveled top wall is arranged to engages the edge of the first slot of a slot track in the locked position when the mounting bracket is installed on a slot track.

7. The mounting bracket according to claim 2, wherein the base is rotatably mounted to the top wall at a pivot positioned between the first portion and second portion of the base.

8. The mounting bracket according to claim 7, wherein the lock is formed of integrally molded plastic resin.

9. The mounting bracket according to claim 1, wherein the support surface further comprises:
- a mounting post projecting from the support surface and having a distal end, the mounting post having at least top and side surfaces extending from the support surface to the distal end;
- a first generally "U" shaped flange extending outwardly from the top and side surfaces at the distal end forming a generally "U" shaped channel between the first generally "U" shaped flange and the support surface; and
- wherein the first end of the storage device connector further includes a second generally "U" shaped flange extending inwardly from the top and side walls; and
- wherein the storage device connector is attached to the support surface with the second generally "U" shaped flange positioned on the mounting post in the generally "U" shaped channel.

10. The mounting bracket according to claim 9, wherein portions of the second generally "U" shaped flange along the storage device connector side walls extend beyond the generally "U" shaped channel when the storage device connector is attached to the mounting bracket and wherein the portions of the second generally "U" shaped flange that extend beyond the mounting post side surfaces further comprise a detent, the detents engaging the mounting post below the generally "U" shaped channel to secure the storage device connector to the mounting bracket.

11. The mounting bracket according to claim 1, wherein the first "J" shaped hook includes a flat surface on at least a portion of the first edge of the support surface, the locking member sliding on the flat surface as the lock is rotated between the locked and unlocked positions.

12. The mounting bracket according to claim 1, further including an actuatable holding system storage device comprising:
- a collar coupled to the second end of the storage device connector;
- an actuator housing coupled to the collar with the actuator housing extending from the storage device connector;
- first and second arms pivotally moveable relative to the actuator housing between an opened position and a closed position;
- an arm contacting element disposed on the actuator housing and axially movable relative to the actuator housing between a first position, in which the arms are moved to the open position, and a second position, in which the arms are moved to the closed position, and rotationally movable relative to the actuator housing to releasably lock the arm contacting element in the first and second positions; and
- a button axially movable relative to the actuator housing and operable upon a first actuation to move the arm contacting element to the first position and upon a second, consecutive actuation to move the arm contacting element to the second position, the button including a distal portion forming a contact surface for actuating the actuatable holding system.

13. The mounting bracket according to claim 12, wherein the actuatable holding system extends outwardly at an angle relative to the first and second spaced apart slots.

14. The mounting bracket according to claim 1, further including a storage basket having a rear wall, a bottom wall, side walls and a front wall; and wherein the rear wall is coupled to the second end of at least two storage device connectors.

15. The mounting bracket according to claim 1, further including a storage shelf having a storage surface and a rear surface; and wherein the rear surface is coupled to the second end of at least two storage device connectors.

* * * * *